United States Patent [19]
Limberg et al.

[11] 3,838,225
[45] Sept. 24, 1974

[54] TSPS KEY SCANNER

[75] Inventors: Anthony Limberg, Potters Bar; William R. Wedmore, Glen Ellyn; John S. Young, Addison, all of Ill.

[73] Assignee: GTE Automatic Electric Laboratories Incorporated, Northlake, Ill.

[22] Filed: Sept. 10, 1973

[21] Appl. No.: 395,896

[52] U.S. Cl. .............................................. 179/27 FF
[51] Int. Cl. ........................ H04q 11/00, H04m 3/62
[58] Field of Search ................................. 179/27 FF

[56] References Cited

UNITED STATES PATENTS 3,484,560 12/1969 Jaeger et al. .................... 179/27 FF

*Primary Examiner*—William C. Cooper

[57] ABSTRACT

The keys of telephone toll service positions have contacts to supply a 3-out-of-9 code on a nine-wire bus. The scanner has multiplex circuits to interrogate the position busses sequentially. There are two bistable devices individual to each position, and two common bistable devices to remember the status from cycle to cycle so that a key must be closed for two cycles to generate a valid message, and another message is not generated until after the key is opened. For some keys an "indication on release" message is generated when the key is opened, under control of the bistable devices. There are seven buffer registers into which messages are loaded in sequence , and which are unloaded in sequence for transmission to a central processor. A key interpreter checks for three or more bits out of nine, all zeros, all ones indicating an unequipped position, or a code common to keys requiring indication or release.

15 Claims, 24 Drawing Figures

OVERVIEW DIAGRAM

OVERALL BLOCK DIAGRAM

MESSAGE CONTROL FLOW-CHART

WIRING DIAGRAM OF KEYS IN A POSITION SHOWING METHOD OF ENCODING

POSITION MULTIPLEXER (MUX)

KEY STATE INTERPRETER
(KSI)

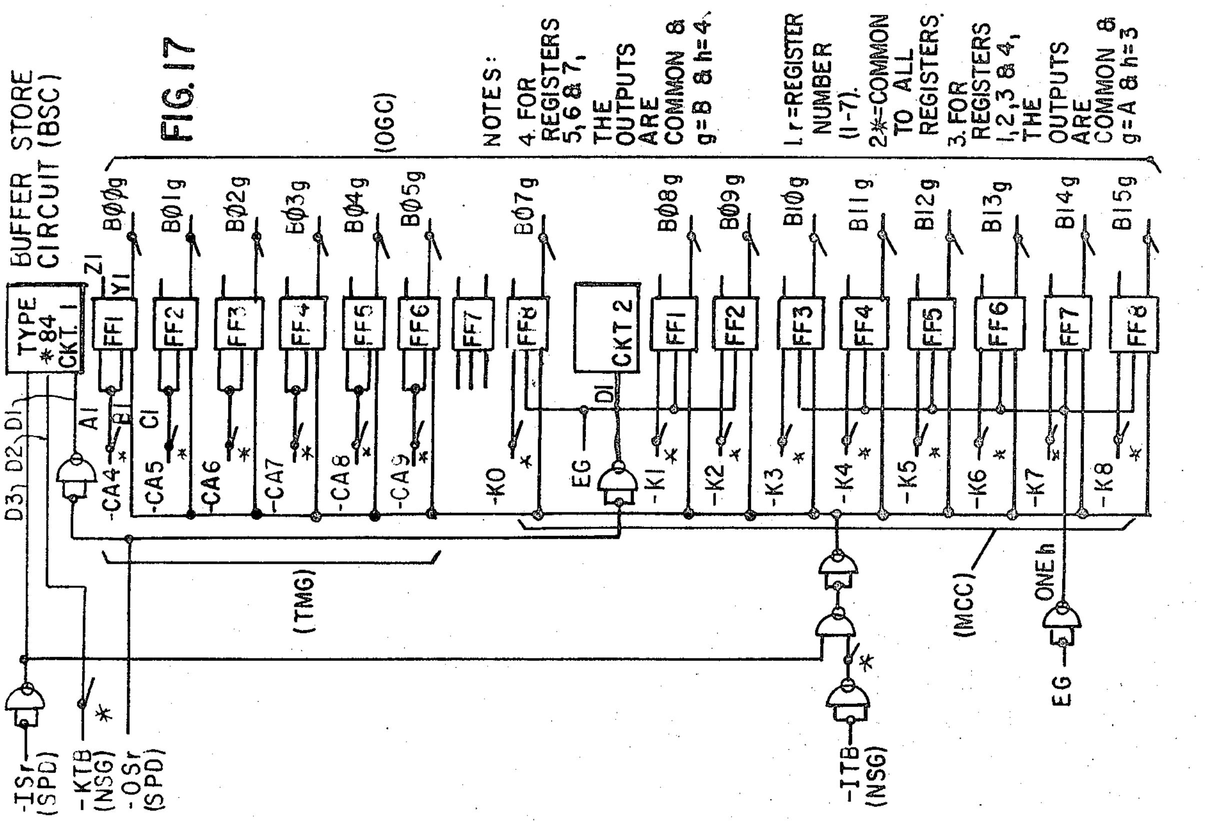
FIG. 13
NEW STATUS WORD GENERATOR (NSG)
NEW.SK = T3·$\overline{PSB}$·$\overline{BFF}$(SK·$\overline{SI}$·$\overline{Z}$+SK·SI·K·$\overline{I}$+$\overline{SK}$·$\overline{SI}$·K)
NEW.SI = T3·$\overline{PSB}$·$\overline{BFF}$($\overline{SK}$·SI·$\overline{Z}$+SK·SI·K·I+$\overline{SK}$·SI·K)
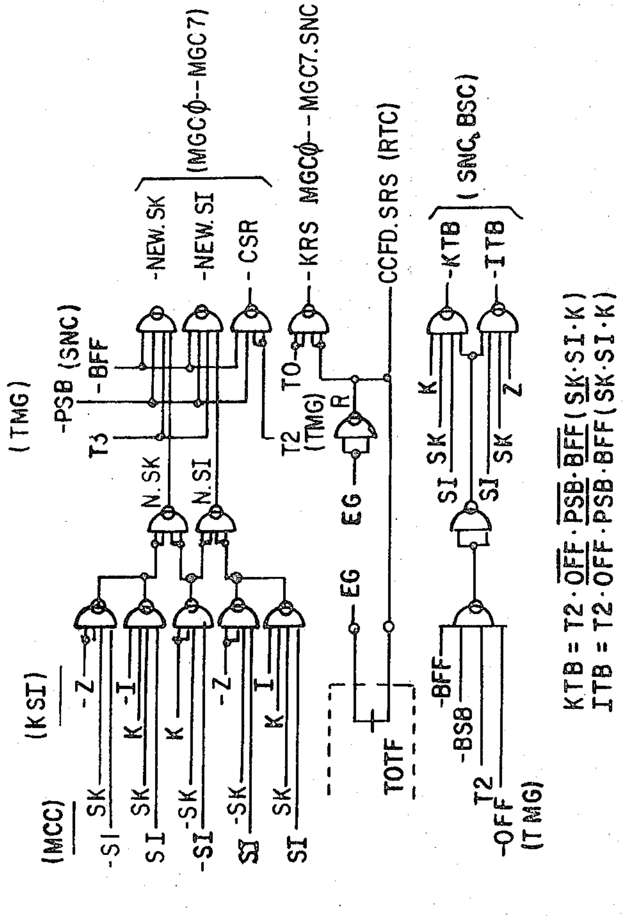
NEW STATUS WORD GENERATOR AND MESSAGE-TO-BUFFER GATING (NSG)
1 NSG PER COPY

TIMING AND CONTROL CIRCUITS (TMG)

POSITION AND SEQUENCE NUMBERS DECODERS (SPD)

OUTPUT GATING CIRCUIT
(OGC)

TSPS KEY SCANNER

BACKGROUND OF THE INVENTION

1. Field of the Invention

This invention relates to a scanner for interrogating the status of contacts of manual or relay switches in a plurality of units, and multiplexing them to a common unit and more particularly to a scanner for keys of telephone operator positions, to send messages relating to operation of the keys to a central processor.

2. Description of the Prior Art

There are many known scanners. An example of a scanner used in a telephone toll service position system for scanning keys of the operator positions appears in the Bell System Technical Journal, Vol. 49, No. 10, December 1970, pages 2,603–2,605.

SUMMARY OF THE INVENTION

This invention is incorporated in a scanner arrangement in which there are a plurality of units scanned, each unit having a plurality of manual keys or relays with contacts connected to signal on M out of N bus conductors, with the scanner sequentally looking at the units to detect an operated key or relay, and generating a message identifying the unit and the particular key or relay operated. According to the invention each unit has two bistable devices individual thereto in the scanner arrangement, to remember different states of the bus signals. The states may be designated as "open," "closing," and "closed." When a unit is scanned, the N bus signal conditions and the state from the two bistable devices is coupled to a common part of the scanner arrangement. An interpreter checks the bus signals for at least M bits, anf for zero bits. The outputs from the interpreter and the state from the bistable devcies are compared by a new status generator. The state of the bistable devices indicates the situation in the preceeding cycle, and the interpreter indicates the situation in the present cycle. If the bistable devices indicate "open" and the interpreter does not indicate at least M signals, the bistable devices are again set to the "open" state. If the preceeding state was "open" and the interpreter indicates M signals, the bistable devices are set to the "closing" state. If the preceeding state was "closing" and the interpreter indicates zero bits, the bistables are returned to the "open" state. If the preceeding state was "closing" and the interpreter does not indicate zero bits, a message comprising the bus bits and the identity of the unit is generated, and the bistable devices are set to the "closed" state. As long as the bistable devices indicate the "closed state" and the interpreter does not indicate zero bits, the bistable devices continue to be set to the "closed" state; but when the interpreter does indicate zero bits the bistable devices are reset to the "open" state.

The advantage of this arrangement is that the operation of a key is not recognized until the M bits are present, so that false codes with less than M bits generated during depression of a key do not result in a message being sent; and the condition with M bits must be present for two successive cycles for a message to be generated, giving some noise protection.

Further, according to the invention, keys are divided into two groups, with one group providing messages for indication on release (IOR). In addition to the "closed" state for keys which do not require an indication on release, there is an "IOR closed" state. The M-out-of-N code has a subset for IOR keys. The interpreter checks for the IOR subset, and if the preceeding state was "closing" when the IOR subset is detected, the bistable devices are set to the "IOR closed" state. Then when the interpreter detects the zero bits condition, when the bistable devices indicate the "IOR closed" state, a special IOR message comprising one of the M-out-of-N codes is generated, and the bistable devices are reset to the "open" state.

DESCRIPTION OF THE DRAWING

FIGS. 12–18 are functional block diagrams of circuits of the key scanner;

DESCRIPTION OF THE PREFERRED EMBODIMENT

The system in which the invention is embodied is described in an article entitled "Improved Efficiency in Toll Handling with TSPS (Traffic Service Position System)" in the GTE Automatic Electric Journal, Vol. 12 No. 7, July 1971, pages 276–285. The central processor is disclosed in a U.S. Pat. application for a Control Complex for TSPS Telephone System by E. F. Brenski, et al, S.N. 289,718 filed Sept. 15, 1972.

TRAFFIC OFFICE CONTROL-OVERVIEW

1. General

All operator's positions associated with a TSPS installation function as a single team. However, it is convenient for administrative reasons to divide the positions into groups and to permit these groups to be independently located as desired by the operating telephone company. Such a group of positions and certain associated administrative and control hardware constitute a traffic office (TO).

a. The following limits have been established:

1. Each traffic office may include up to 62 positions.
2. Up to nine traffic offices may be provided; however total positions may not exceed 320.

b. In addition to the operator's positions, a traffic office is considered to include:

1. A redundant voice band Data Link for two-way communication with the central control unit.
2. A Display Buffer and associated control equipment for turning lamps on and off at the positions under program control.
3. A Key Scanner for sensing and reporting operator key operations to the program.
4. A Centralized Supervisor system. This is an independent switching arrangement for voice communications between operators and supervisors within the traffic office.
5. Administrative cabinets, which provide a lamp display of position status.
6. Controlled Traffic Cabinet, which permits the chief administrator (operator) to communicate certain instructions to the program.
7. Each traffic office includes a read only teletype machine for reporting force administration information to the chief operator as a part of the FADS program (Force Administration Data System). The teletype is controlled via a dedicated facility and is treated as an I/O device rather than a part of the traffic office control.
8. The Maintenance Report Generator originates various fault and diagnostic response messages which are sensed and reported by the Key Scanner in a manner identical to that for key operations on working positions. It is therefore referred to as a psuedo position with address ϕϕ although there is nothing that physically resembles a console.
9. Means are provided for training new operators independent from "live" traffic. Training positions and associated control units are included as a permanent part of the traffic office; this equipment simulates various call handling situations. Training equipment has no connection with other units in the traffic office or with the base control, and is not discussed further in this specification.

Figure 1:
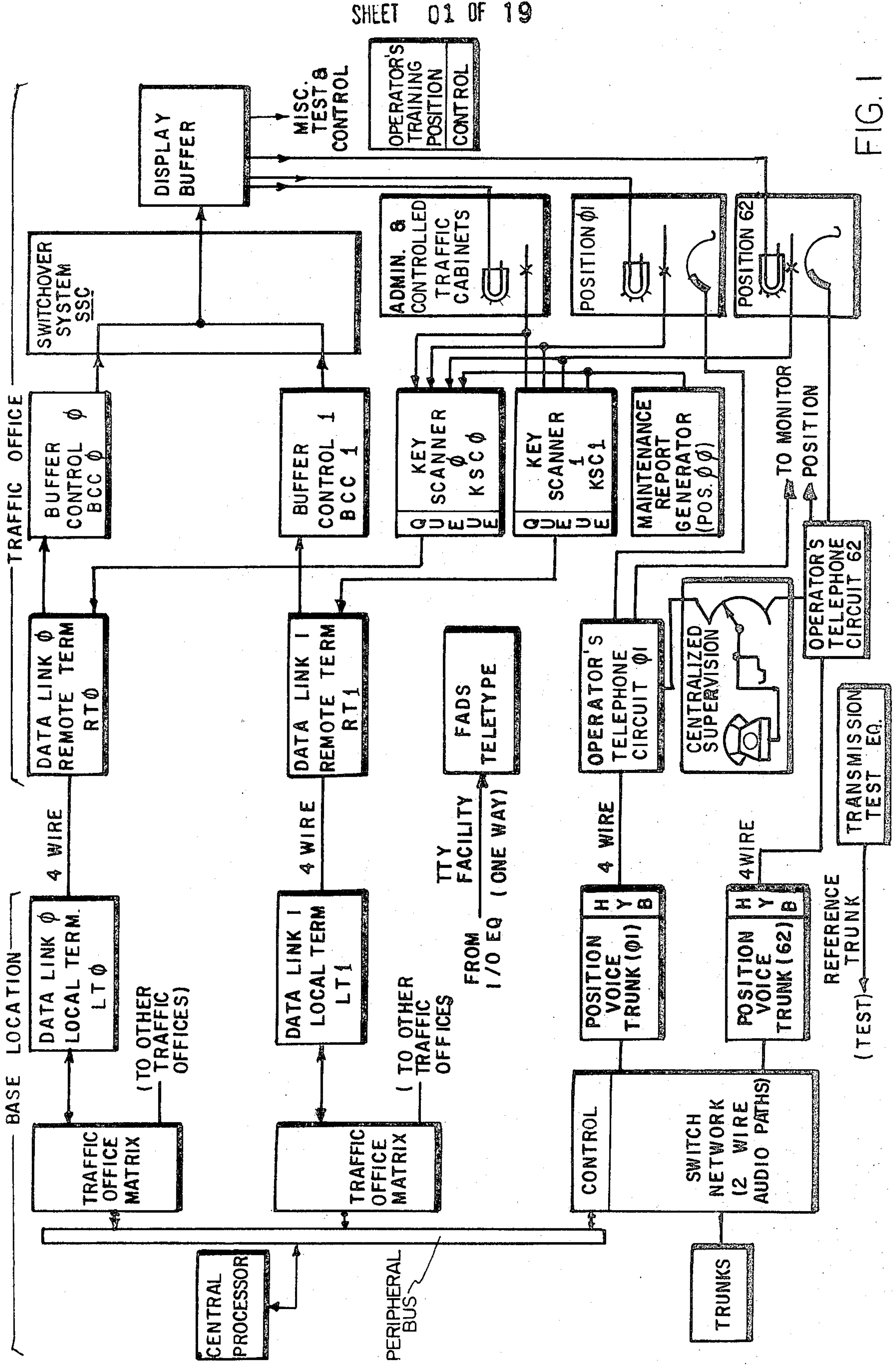
FIG. 1 is a block diagram of a traffic office and its interconnection with the base unit in a TSPS system.

A block diagram of a Traffic Office and is interconnection with the base unit is shown in FIG. 1. The Traffic Office portion of the equipment shown is a separate entity, and is so treated regardless of location. That is, there are no differences in the hardware types, frame complements, or method of operation whether the Traffic Office is collocated with the base unit or is remote, except that in the former case it is feasible to share power supplies.

c. As shown, there are a number of facilities dedicated for the interconnection requirements. In the collocated case these reduce to switch-board cable; otherwise, it is necessary to consider the transmission and reliability constraints for each function. A Traffic Office is divided into two distinct areas:

1. The operating area is designed to provide a pleasant working environment for the operating team, with careful attention paid to such things as color schemes, ambient light and noise, and floor plans. This area contains those equipment items having to do directly with the team, and includes the working and training consoles, administrative cabinets, Supervisor's telephone equipment and the FADS teletype.
2. The equipment room contains the following items:

A. Two-Traffic Office Control Frames (TOCF) (See FIG. 2).
B. One Traffic Office Transfer (TOTF)
C. A plurality of Display Buffer Circuit Frames (DBCF). One frame is required for each ten equipped positions.
D. One-Traffic Office Supervisory Frame (TOSF).
E. One Operator's Position Equipment Frame (OPEF)
F. Conventional telephone type D.C. power (48 V. nominal), 150 Ampere capacity.
G. Carrier and/or other facility related equipment as required.

In the collocated case, the Traffic Office equipment area is a part of the base unit and is served by the same power supply.

2. Hardware Organization 2.1 Common Control a. A convenient starting point for considering the functions of the various hardware groups is the unit of packaging: the frame.

At the base location, traffic office control functions center on the Traffic Office Access Frame (TOAF); that is, the frame contains the hardware that directly interfaces with the stored program control. This equipment includes those items on the block diagram FIG. 1 shown as the Traffic Office Matrix and the Data Link, Local Terminal.

At the Traffic Office the principal control functions are provided by equipment located in the Traffic Office Control Frame (TOCF). This equipment includes the Data Link Remote Terminal (RT), the Buffer Control (BCC), and the Key Scanner (KSC). Together these two frames and appropriate interconnecting facilities constitute an electronic common control.

Two copies of this common control are always provided. On FIG. 1 the number ϕ and 1 on each of the respective subdivisions of the control indicate the copy number.

Figure 2:
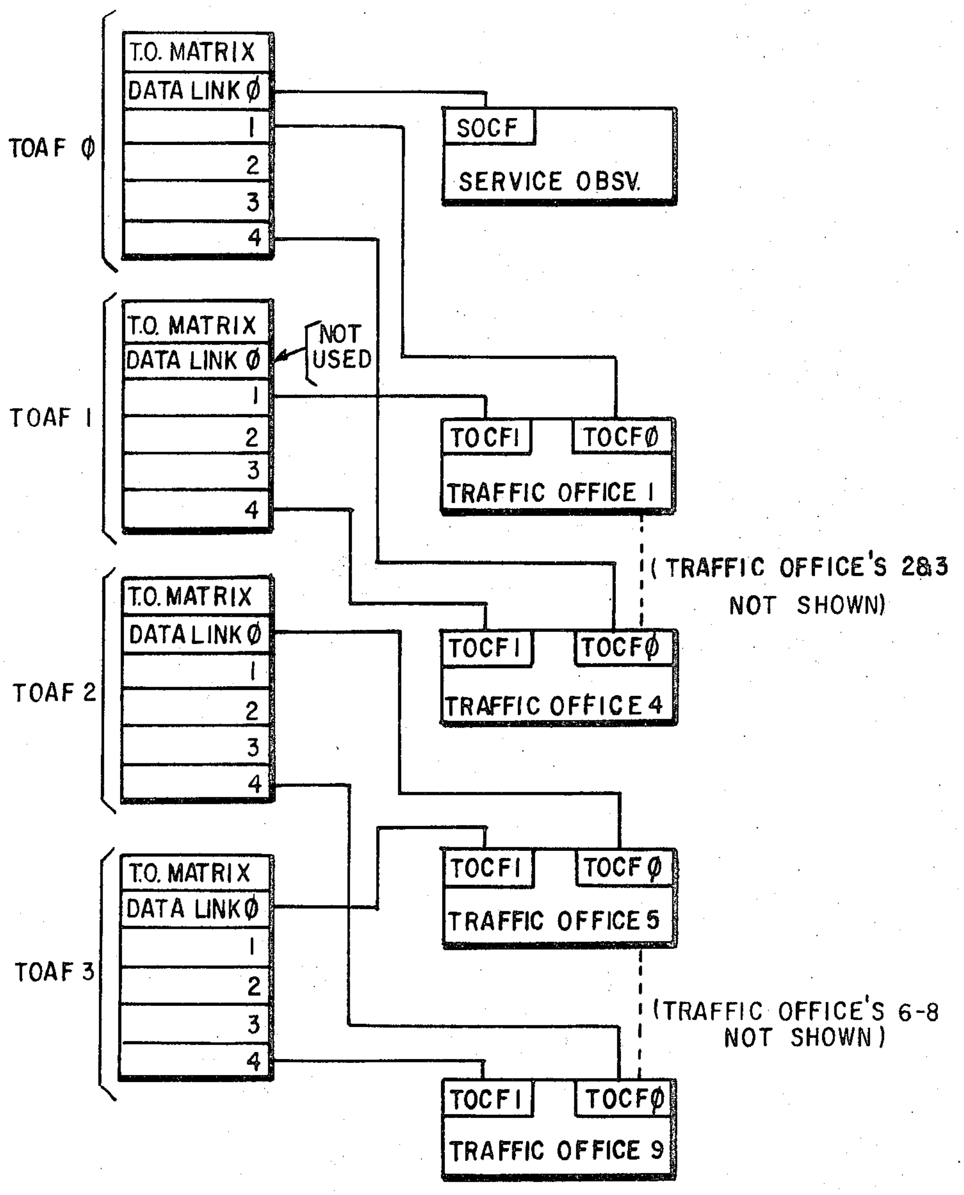
FIG. 2 illustrates the assignment and duplication plan for the equipment of FIG. 1 for a maximum installation of nine traffic offices.

One Traffic Office Matrix (TOM) serves as the program interface for five data links, each serving a different Traffic Office. FIG. 2 illustrates the assignment and duplication plan for this equipment for a maximum installation of nine Traffic Offices. Note that a non-duplicated link is assigned to Service Observing, which therefore has some of the dimensions of a tenth Traffic Office. In the organization of the Traffic Office Access Frame, a Bus Interface (mnenonic BIB) provides the connection with the A.C. bus system and hence with the Peripheral Control. Physically, the Traffic office Matrix is distributed in the various files containing the Local Terminal logic. Electrically, the TOM is a specialized form of Control Matrix broadly classified as a Hybird Matrix (HYM). As is the case with other types of matrices, the TOM consists of 16 words of 32 bits each which can be addressed by program on a word basis for writing and/or reading. The bistable element is a flip-flop implemented with High Threshold Logic. The TOM bistable is called a Dual Access Matrix Point (DAMP), because it can be set and reset by external hardware as well as under program control. Bits in the matrix are assigned as data registers, hardware/software interface control functions, and various hardware counters, etc. In general, each Local Terminal, its associated portion of the TOM and its data modem are divided into transmit and receive groupings, indicating data transmission to and from the traffic office.

The data system is essentially a parallel to serial to parallel arrangement. Serial transmission over the facility uses Frequency Shift Keying, Duo-binary encoding and is at the rate of 2,400 bits/second. The Remote Terminal includes the data modem and associated logic for receiving and transmitting messages from and to the base location.

Principal data originating at a Traffic Office are operator key operations. The Key Scanner sequentially gates each position key bus into detecting logic.

When a valid key operation is noted, the position identity and an appropriate code for the particular key are loaded into a queue register. The latter can store up to seven such messages; this covers the random and asynchronous nature of the source data and establishes the input for the Remote Terminal.

Messages originating in software are received at the Remote Terminal and extended to the Buffer Control Circuit for decoding and (usually) selection of a lamp control function.

b. Method of Operation

Normally one of the copies of the Traffic Office Control is "active" and the other "standby." Quiescently, the two pairs of modems each transmit an "idle pattern" in each direction. This consists of alternate ones and zeros and serves to maintain receiver synchronism and verify the operability of the link.

At intervals of 20 milliseconds the Traffic Office Control Program (TOCP) loads a message into the DAMP transmit register associated with the active copy, and unloads the data (if any) from the receive register. The message loaded by TOCP is 19 bits long and includes a position address (one of 64), the identity of a single lamp on that position, and the control action to be performed (on, off, flash). Also, each message contains a three bit sequence number to ensure that no messages are missed.

If no message is available at the TOCP entry time, a dummy message is loaded with sequence number $\phi\phi\phi$. Thus the active copy is handling a continous flow of 50 messages per second. Transmit time is approximately 12 milliseconds, so that the remaining 8 milliseconds are occupied with the idling pattern.

At the time a message is loaded, the Local Terminal initiates a "start-of-message" sequence of four bits to flag the remote receiver that a message is coming. During transmission a Bose-Chaudhuri check sum of five bits is computed; this is appended after the message bits.

When the receiver detects "start-of-message" succeeding data bits are loaded into a register. The sequence number received is verified, and a Bose-Chaudhuri check sum that is computed locally is matched with that received from the transmitter. If all checks pass, the message is extended to the Buffer Control, and a return message is initiated. The latter will be a report of a key operation if such a message is stored in Key Scanner queue; otherwise a dummy message is sent. Messages transmitted from the Traffic Office are similar in form to those from the base location, and also include sequence numbers and check sums.

If something is wrong with a received message a return message asks for a retransmission, and identifies the sequence number at the point of failure. This causes a back-up at the transmitting end, resending all messages from that point. This sequence therefore provides maximum software control of the operation. The Traffic Office transmits a message when and only when a message has been received. Such a stimulus-response characteristic quickly detects a malfunction, permitting appropriate maintenance action to be taken.

The standby copy also operates in the stimulus-response mode. The Call Processing program has no interest in this copy, hence only maintenance routines will access the standby control.

2.2 Display Buffer

Each Display Buffer Circuit Frame (DBCF), serves up to 10 positions. Five matrix-size files are provided, each of which mounts relay cards for lamp control on two positions.

Type HQA relays are electrically organized in a coordinate array; a particular relay is operated via coincident activation of a Position Select line and a Function Select line. The active copy of BCC decodes the appropriate bits in the incoming message and turns on Main Battery and Main Ground (electronic) switches to secure the desired operation.

The selected relay may be one of a group, the contacts of which perform the final decoding operation to select one lamp of N in a particular group whose members are mutually exclusive. (In some cases N=1; i.e., only one relay is needed in such a "group"). Other relays are employed to specify a flashing mode of operation for a particular lamp group. A third classification of relay breaks a locking circuit for other relays in a group, and therefore performs the reset function.

Since 10 positions are served by one DBCF, six frames are required to implement 60 positions within a Traffic Office. A seventh frame with only file A equipped is necessary when positions 61 and 62 are provided.

The Display Buffer is a simplex unit, controlled by the active copy of BCC. The Switchover System (described later) establishes the association of the DB with BCC.

Certain miscellaneous functions are selected by BCC at position addresses $\phi\phi$ and 63. The relays involved are not strictly a part of Display Buffer and are mounted elsewhere; however, they are logically an extension of the same coordinate array.

2.3 Centralized Supervision

The Centralized Supervision System is a locally controlled switching arrangement for establishing audio paths within the Traffic Office. There are two principal modes of operation:

a. An operator initiates a request for a connection to a supervisor, typically while connected to a suscriber. The supervisor can answer at one of two Call Commander key telephones, or at one of (up to) 10 floor locations.

b. A supervisor initiates a monitoring or talking connection to a position from the Call Commander location.

Miscellaneous key telephone features such as regular Central Office lines are provided as desired by the operating company.

2.4 Traffic Office Transfer Frame

The TOTF is so named because it is the home of the Switchcover System SSC. In addition, several unrelated miscellaneous circuits are mounted in this frame, including:

a. Power and Line equipment for the key telephones.

b. Monitoring Amplifiers for the monitoring position and supervisors c. Position 63 and $\phi\phi$ equipment, which includes the control of the Administrative Cabinet, the Maintenance Report Generator, and the Test and Monitor Buffer.

d. Distribution relays for flashing lamp power and for "Call Waiting" lamps.

e. Configuration Control and indicator keys and lamps. The TOTF is located between the two copies of TOCF and therefore is a convenient point for monitoring and selecting certain maintenance functions associated with common control.

2.5 OPEF

Operator's Positions Equipment Frame (OPEF) mounts position dedicated relay equipment which provides interfaces with Centralized Supervision, Monitoring and Test functions, and with the voice facility to the base location.

Reference Trunk hardware (used to check the performance of operator's voice facilities is also mounted in this frame.

3. Base Location To Traffic Office Inter-Connection Facilities 3.1 Data Link

As mentioned above, the data system employs Duobinary Encoding and Frequency Shift Keying (FSK); data rate is 2,400 bits per second. It therefore requires a voice band circuit, and any type of voice facility can be used provided that facility meets applicable standards. Thus, this service might be provided via physical cable pairs, conventional or PCM carrier, or radio links.

Each of the two links for a particular Traffic Office is a 4-wire circuit providing independent transmission in each direction. It is important to note that two links are provided for reasons of security, and that failure of both constitutes a complete outrage of that Traffic Office. It is therefore very desirable able that no single fault (as of a carrier group, power supply, or cable route) should affect both links.

3.2 Operators Voice Facilities

Each equipped operator's position requires a dedicated 4-wire facility for voice transmission. As with the data system, physical plant, carrier channels, etc. may be used for these facilities provided applicable transmission specifications are met.

No signalling equipment is used with operator voice channels, as all call handling information other than voice is exchanged via the data system.

Since various types of carrier offer economical means of providing relatively large numbers of voice channels, it is necessary to consider the effects of faults in such equipment that could affect a significant number of positions. The occupancy of a staffed position is high, and a relatively small loss of total capability might seriously degrade the performance of the system. Accordingly, means have been provided to transfer a group of Position Voice Trunks from a failed carrier group to a standby group. The number of groups required per Traffic Office and the number of positions assigned per group are variables to be wired per job requirements. Only one standby group is used, which can then be substituted for any one of the (up to eight) working groups. The "transfer relays" at each end of a working group can be operated to affect the desired transfer. This is a manual procedure, initiated by an entry on the maintenance teletype.

3.3 Teletype Facility

The facility needed for the Traffic Office FADS teletype may be any standard circuit capable of 100 w.p.m. operation. No special security precautions are necessary, as temporary loss of this function is non-service affecting.

3.4 Reference Trunk

A relay switch is provided at the Traffic Office end of each operator's voice facility to connect it to a reference trunk. This provided for one-man testing of these facilities at the base location. The reference trunk is a one-way voice band circuit. Selection and control of the required switch is via the BCC and Test and Monitor Buffer (TMB); the Maintenance Main initiates the message to appropriate programs that in turn cause the above switching action via a data message to the Traffic Office.

KEY SCANNER

General

The Key Scanner Circuit (KSC) detects events within the Traffic Office and constructs appropriate messages for transmission and subsequent reporting to the program. Most of the events of interest are key operations at the (up to) 62 operator's positions; others are key operations at the Controlled Traffic Cabinet, outputs of the Maintenance Report Generator (MRG), and change of status at a position (headset in or out).

The MRG and the Controlled Traffic Cabinet are assigned (position) addresses $\phi\phi$ and 63, respectively. Thus there are effectively 64 addresses or positions within the Traffic Office which can originate signals to KSC.

Position Bus

A separate nine wire bus is dedicated to each position, and appears in multiple at both copies of KSC. This is the only area of commonality between the two copies; in all other respects they function independently and asynchronously. Each copy performs a continuous sequential scan of the 64 busses, except when interrupted by a Position Status Request, as described below.

A basic assumption of this subsystem is that only one key will be operated at a time at a particular position. Such an operation marks three of the nine wires in that position bus. The possible combinations of nine things taken three at a time is 84. Initial requirements are for 64 codes from the Traffic Service Positions (TSP), as shown in the table 3/9 code assignments, leaving 20 unassigned within the chosen structure. The table also shows the assignment of codes for the Controlled Traffic Cabinet (CTC), and for POS $\phi\phi$, which includes the MRG and the Traffic Office Test Set.

Figure 8:
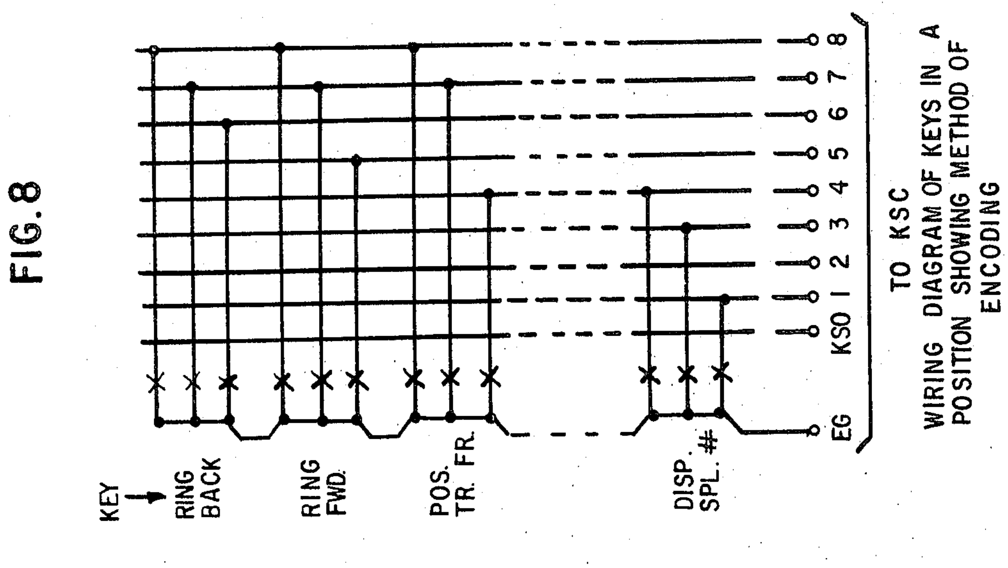
FIG. 8 is an empirical sketch of the key-bus wiring in a position.

Since only one valid message can exist on a position bus, it follows that all keys and other signal sources must be momentary contact in order that the bus will be cleared prior to the next message from that address. Each position key has three contacts which are hardwired to three leads in the bus in accordance with the assigned code for that key, (See FIG. 8). The MRG is similarly arranged except that relay contacts substitute for the manual key contacts.

Figure 9:
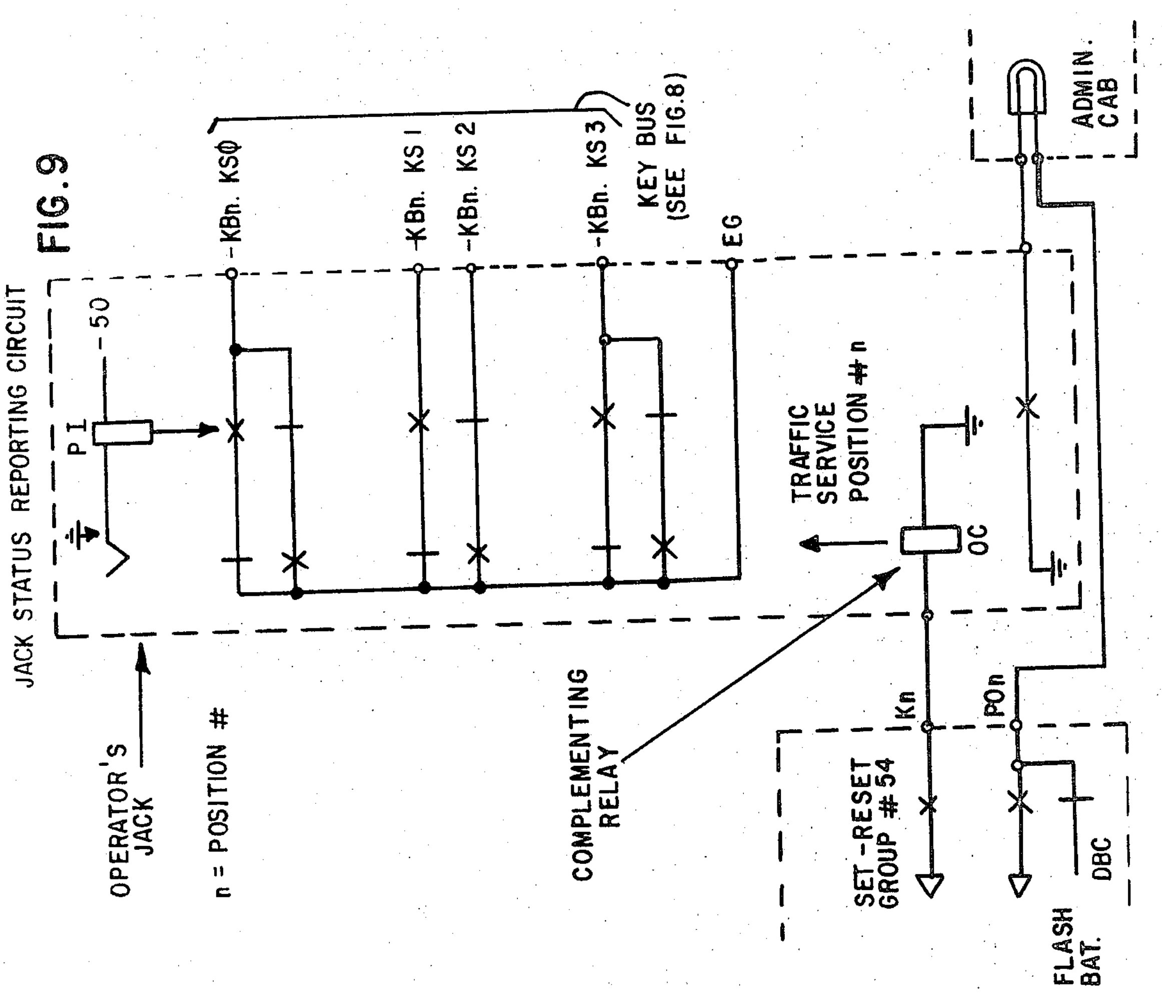
FIG. 9 is a diagram of the circuit for a change of status message (headset plugged or unplugged) of a position.

Relay contacts are also employed for developing change of status messages from the positions (Headset plugged or unplugged) (as shown in FIG. 9). When such a

3/9 CODE ASSIGNMENTS

| | INDICATION K0 → K8 | TSP KEY (POS. 01–62) | ACT KEY (POS. 63) | MRG/TRAFFIC OFFICE TEST SET (POS. 00) |
|---|---|---|---|---|
| IOR CODES | 0 0 0 0 0 0 1 1 1 | RING BACK | | |
| IOR CODES | 0 0 0 0 0 1 0 1 1 | RING FWD. | | |
| IOR CODES | 0 0 0 0 1 0 0 1 1 | POSN. TRFR. | | |
| IOR CODES | 0 0 0 1 0 0 0 1 1 | COIN COLL. | | |
| IOR CODES | 0 0 1 0 0 0 0 1 1 | COIN RET. | | |
| IOR CODES | 0 1 0 0 0 0 0 1 1 | CNL TMG. | | |
| IOR CODES | 1 0 0 0 0 0 0 1 1 | DISPLAY TIME | | |
| IOR CODES | 0 0 0 0 0 1 1 0 1 | DISPLAY CHG. | | |
| IOR CODES | 0 0 0 0 1 0 1 0 1 | | | |
| IOR CODES | 0 0 0 1 0 0 1 0 1 | | | |
| IOR CODES | 0 0 1 0 0 0 1 0 1 | | | |
| IOR CODES | 0 1 0 0 0 0 1 0 1 | | | |
| IOR CODES | 1 0 0 0 0 0 1 0 1 | | | |
| IOR CODES | 0 0 0 0 1 1 0 0 1 | 1 | 1 | MRG. CURRENT SENSOR NO. 1. COPY Ø |
| IOR CODES | 0 0 0 1 0 1 0 0 1 | 2-ABC | 2 | MRG. CURRENT SENSOR NO. 2. COPY Ø |
| | 0 0 1 0 0 1 0 0 1 | 3-DEF | 3 | MRG. CURRENT SENSOR NO. 3. COPY Ø |
| | 0 1 0 0 0 1 0 0 1 | 4-GHI | 4 | MRG. CURRENT SENSOR NO. 4. COPY Ø |
| | 1 0 0 0 0 1 0 0 1 | 5-JKL | 5 | MRG. CURRENT SENSOR NO. 5. COPY Ø |
| | 0 0 0 1 1 0 0 0 1 | 6-MNO | 6 | MRG. CURRENT SENSOR NO. 1. COPY 1 |
| | 0 0 1 0 1 0 0 0 1 | 7-PRS | 7 | MRG. CURRENT SENSOR NO. 2. COPY 1 |
| | 0 1 0 0 1 0 0 0 1 | 8-TUV | 8 | MRG. CURRENT SENSOR NO. 3. COPY 1 |
| | 1 0 0 0 1 0 0 0 1 | 9-WXY | 9 | MRG. CURRENT SENSOR NO. 4. COPY 1 |
| | 0 0 1 1 0 0 0 0 1 | Ø | 0 | MRG. CURRENT SENSOR NO. 5. COPY 1 |
| | 0 1 0 1 0 0 0 0 1 | ST | ST | MRG. INVALID BCC Ø RECONFIGURE MSG. |
| | 1 0 0 1 0 0 0 0 1 | | KP INCL. | MRG. INVALID BCC 1 RECONFIGURE MSG. |
| | 0 1 1 0 0 0 0 0 1 | | KP ACV. | MRG. INVALID BCC Ø & 1 |
| | 1 0 1 0 0 0 0 0 1 | | | MRG. TRANSFER RELAY FAIL |
| | 1 1 0 0 0 0 0 0 1 | KP RATE | | MRG. MOD. FAIL. COPY Ø |
| | 0 0 0 0 0 1 1 1 0 | KP NFY | | MRG. MOD. FAIL. COPY 1 |
| | 0 0 0 0 1 0 1 1 0 | KP SPL | | MRG. DEMOD. FAIL. COPY Ø |
| | 0 0 0 1 0 0 1 1 0 | KP BACK | | MRG. DEMOD. FAIL. COPY 1 |
| | 0 0 1 0 0 0 1 1 0 | KP FWD. | | MRG. CENT. SUPV. MAJOR |
| | 0 1 0 0 0 0 1 1 0 | KP TRBL. | | MRG. CENT. SUPV. MINOR |
| | 1 0 0 0 0 0 1 1 0 | | | MRG. FUSE. MRG. CARD 1 |
| | 0 0 0 0 1 1 0 1 0 | STATION PAID | | MRG. TOCF Ø FUSE ALM. |
| | 0 0 0 1 0 1 0 1 0 | STATION COL. | | MRG. TOCF 1 FUSE ALM. |
| | 0 0 1 0 0 1 0 1 0 | STATION SPL. CLG. | | MRG. EQPT. ALM. MAJOR |
| | 0 1 0 0 0 1 0 1 0 | STATION SPL. CLD. | | MRG. POWER ALM. MAJOR |
| | 1 0 0 0 0 1 0 1 0 | STATION AUTO. COL. | | MRG. EQPT. ALM. MINOR |
| | 0 0 0 1 1 0 0 1 0 | STATION DDD | | |
| | 0 0 1 0 1 0 0 1 0 | | | MRG. REQUEST, TOCF Ø |
| | 0 1 0 0 1 0 0 1 0 | PERSON PAID | | MRG. REQUEST, TOCF 1 |
| | 1 0 0 0 1 0 0 1 0 | PERSON COL. | | MRG. POWER ON, TOCF Ø |
| | 0 0 1 1 0 0 0 1 0 | PERSON SPL. CLG. | | MRG. POWER OFF, TOCF Ø |
| | 0 1 0 1 0 0 0 1 0 | PERSON SPL. CLG. | | MRG. POWER ON, TOCF 1 |

3/9 CODE ASSIGNMENTS

| INDICATION K0 → K8 | TSP KEY (POS. 01–62) | MRG./T.O. TEST SET (POS. 00) |
|---|---|---|
| 1 0 0 1 0 0 0 1 0 | | MRG. POWER OFF, TOCF 1 |
| 0 1 1 0 0 0 0 1 0 | | MRG. LOCAL TEST, TOCF |
| 1 0 1 0 0 0 0 1 0 | NO AMA | MRG. TRANSFER TOCF |
| 1 1 0 0 0 0 0 1 0 | OGT 1 | MRG. INT. Ø FAIL |
| 0 0 0 0 1 1 1 0 0 | OGT 2 | MRG. INT. Ø FAIL |
| 0 0 0 1 0 1 1 0 0 | OGT 3 | |
| 0 0 1 0 0 1 1 0 0 | OGT 4 | |
| 0 1 0 0 0 1 1 0 0 | | |
| 1 0 0 0 0 1 1 0 0 | T & C | |
| 0 0 0 1 1 0 1 0 0 | PERSON CALL BK. | MRG. FUSE, MRG. CARD 2 |
| 0 0 1 0 1 0 1 0 0 | RLS BACK | T.O. TEST 1 |
| 0 1 0 0 1 0 1 0 0 | RLS FWD | T.O. TEST 2 |
| 1 0 0 0 1 0 1 0 0 | SR | T.O. TEST 3 |
| 0 0 1 1 0 0 1 0 0 | MAKE BSY | T.O. TEST 4 |
| 0 1 0 1 0 0 1 0 0 | GST | T.O. TEST 5 |
| 1 0 0 1 0 0 1 0 0 | | T.O. TEST 6 |
| 0 1 1 0 0 0 1 0 0 | HOLD 1 | T.O. TEST 7 |
| 1 0 1 0 0 0 1 0 0 | HOLD 2 | T.O. TEST 8 |
| 1 1 0 0 0 0 1 0 0 | HOLD 3 | T.O. TEST 9 |
| 0 0 0 1 1 1 0 0 0 | ASC 1 | T.O. TEST Ø |
| 0 0 1 0 1 1 0 0 0 | ASC 2 | T.O. TEST ST |
| 0 1 0 0 1 1 0 0 0 | ASC 3 | T.O. TEST KP 1 |
| 1 0 0 0 1 1 0 0 0 | | T.O. TEST KP 2 |
| 0 0 1 1 0 1 0 0 0 | ST. TMG | T.O. TEST KP 3 |
| 0 1 0 1 0 1 0 0 0 | CA CALL | |
| 1 0 C 1 0 1 0 0 0 | REC. MSG | |
| 0 1 1 0 0 1 0 0 0 | POS. RLS | |
| 1 0 1 0 0 1 0 0 0 | | |
| 1 1 0 0 0 1 0 0 0 | DISP. CLG. NO. | |
| 0 0 1 1 1 0 0 0 0 | DISP. CLD. NO. | |

3/9 CODE ASSIGNMENTS – Continued

| INDICATION K∅ → K8 | TSP KEY (POS. ∅1-62) | MRG./T.O. TEST SET (POS. ∅∅) |
|---|---|---|
| 0 1 0 1 1 0 0 0 0 | DISP. SPL. NO. | |
| 1 0 0 1 1 0 0 0 0 | | |
| 0 1 1 0 1 0 0 0 0 | | |
| 1 0 1 0 1 0 0 0 0 | MONITOR | |
| 1 1 0 0 1 0 0 0 0 | | |
| 0 1 1 1 0 0 0 0 0 | | |
| 1 0 1 1 0 0 0 0 0 | JACK OUT | |
| 1 1 0 1 0 0 0 0 0 | JACK IN | |
| 1 1 1 0 0 0 0 0 0 | IOR PHRASE | |

(IOR PHRASE IS LOADED WHEN IOR IS RELEASED)

change occurs, the state of relay PI (plug-in) no longer matches that of OC, thus marking three bus wires until a program response changes the state of OC.

Scanner Operation

Associated with each position bus in each copy of KSC is a two bit memory, the reason for which will become apparent in considering the following sequence in the generation of a message:

1. The scanner detects three (or more) marks on a particular bus, and the memory indicates that this condition was not there on the last visit. The memory is updated to indicate "valid indication observed once."
2. On the next visit, assuming there are still three marks at that address, the position identity and key indication are loaded into a message buffer store, for subsequent transmission via the data system. The memory is updated to one of two states, both indicating that a message has been loaded from that position (address). The difference between the two states is described below in (4).
3. As long as the key remains depressed, subsequent visists of the scanner cause no change in the memory; this insures that only one message is generated for each key operation.
4. When the key is released the scanner observes no marks on the bus, along with one of the memory states in (2) above.
   a. If the key was an "ordinary" key, the memory is reset, and the scanner moves on.
   b. If the key was in the IOR (Indication On Release) group, the IOR message is loaded into the message store before resetting the memory. The IOR category is reserved for those keys for which some software action is required when the key is restored, such as clearing the display when Time (of Day) key is released.

In either case, the position is now initialized and can generate new messages.

The scan rate was chosen using the following criteria:

a. As noted, a key must be "seen" twice before forwarding a report; this is a precaution for minimizing noise problems.
b. A fast keying operator might produce contact closures as short as 30 m.s.
c. The scanner is derived from the clock used by the Data Modem (38.4 KHz), and a sub-multiple of this frequency sets the rate.

A complete scan of the 64 positions requires 13.3 m.s., insuring that a key closure of 26.6 m.s. or more will be detected.

Buffer Store

The message buffer store provides for seven messages. Each transmitted message includes a "sequence number" which is obtained directly from the queue element in which it is stored. Two pointers control loading and unloading of the store, respectively, and jointly control "Buffer full" and "Buffer empty" logic indicators.

When the buffer is full, new key messages are not loaded, and the individual position status memory is not updated. Therefore, if the key remains depressed there is a high probability that a queue location will become vacant and a subsequent scanner visit will cause the message to be loaded. In this sense, additional buffering is implicit, since typical key depressions are of the order of 60 m.s. duration and may be much longer.

The store is unloaded by the data system in response to an incoming message, normally at the rate of one message each 20 m.s. When the buffer is empty a dummy message is sent instead of a message from store.

A special incoming message called the Position Status Request causes the sequential scan to be interrupted and the bus values at the position specified are extended directly to the data system.

Another special incoming message called Retransmission Request causes the out pointer to be set back to an indicated store location, thus repeating messages from that point in the sequence.

The designation of the on-line copy is maintained via a contact in the Switch over System. Normally the inactive copy is inhibited from loading messages in order to prevent the buffer from filling with seven messages in the absence of any software activity to extract them. Maintenance software can cause the inhibition to be lifted when it is desired to conduct tests of the off-line unit.

Another set of contacts in the TOTF provides a system reset facility for each copy of the TOCF and operates whenever the power is turned on. In the KSC, system reset clears the buffer store, sets the Sequence Number to unity and insures that there are no incorrect records of previous key states.

External Signals and Functions of the KSC a. The Interface with Positions (FIG. 3)

Figure 3:
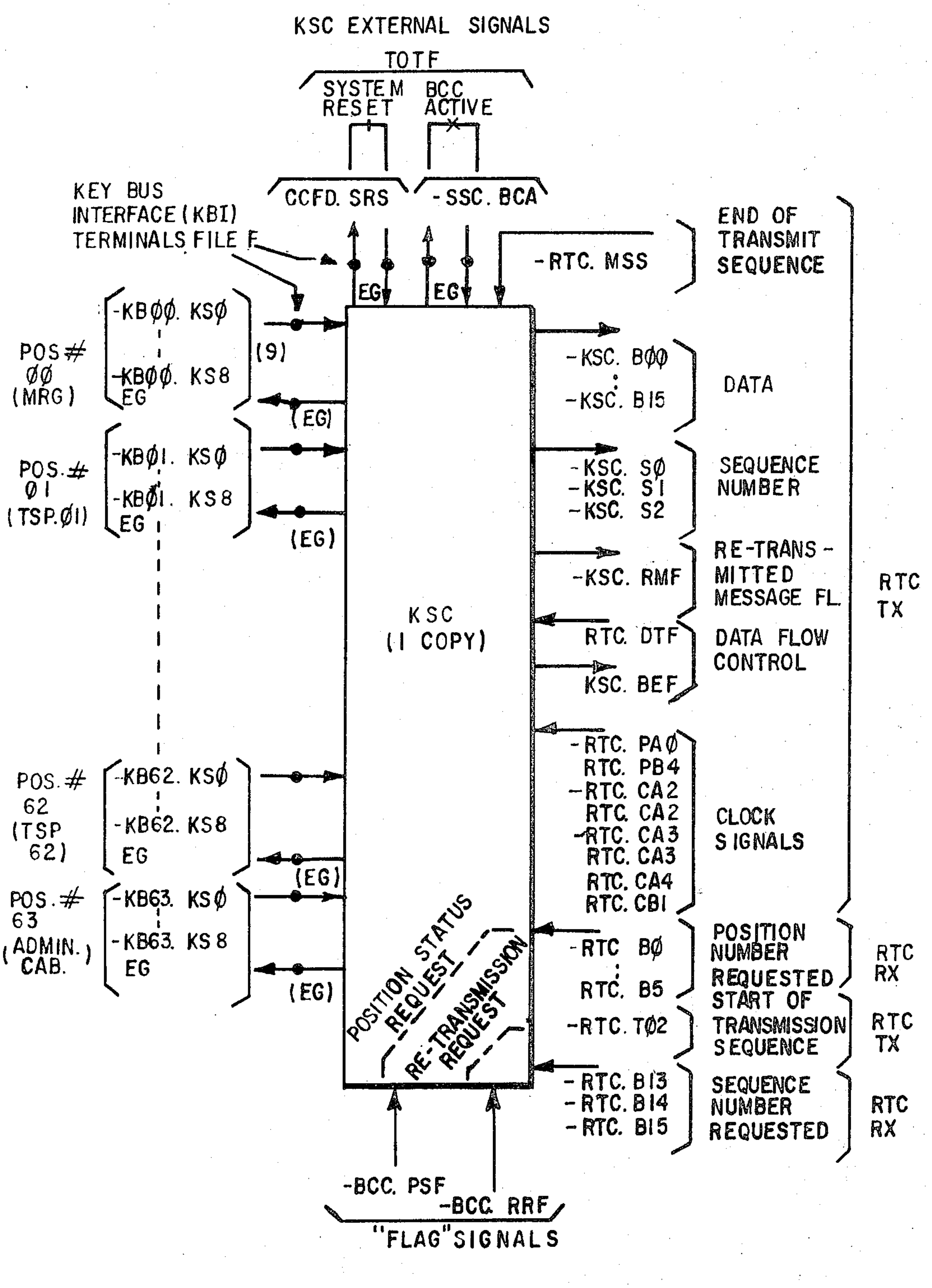
FIG. 3 shows the interface of a key scanner circuit with the remote terminal circuit.

A nine-wire bus from each position conveys the signals -KB$n$·KS$\phi$ through -KB$n$·KS8 (where $n$ =Positions No.) to the KSC as shown on FIG. 3. When no keys are pressed, the signal on each line is positive corresponding to logic ZERO in the final data as received by the CPU. When a key is pressed, three uniquely assigned lines are grounded in accordance with the 3/9 code assignment. An empirical sketch of the Key-bus wiring in a Position is given on FIG. 8.

b. The Interface with RTC (See FIG. 3)

Messages to be read by the RTC are presented at the interface as shown (DATA on FIG. 3) together with the Sequence Number. Each time a message has been transmitted by the RTC, the Data Taken Flag (RTC. DTF) is made true. This causes the KSC to present the next message and to increase the sequence number by one. The Sequence Number can have any value in the range 1 through 7 only.

When, on receipt of RTC.DTF, there are no more messages in the buffer store, the Buffer Empty Flag (KSC.BEF) is made true and remains so until another message is available. Until the buffer ceases to be empty, the RTC suppresses RTC.DTF.

All timing in the KSC is derived from the clock signals which are generated in the RTC. Therefore, the signals between the KSC and RTC transmit logic are synchronous.

c. Re-Transmission Request (See FIG. 3)

The signal -BCC.RRF (Re-Transmission Request Flag) is made false when a request for a re-transmission has been received at the TOC. When -BCC.RRF goes false, the KSC back-steps to the sequence number requested (-RTC.B13, B14 and B15) and changes the data accordingly. Also, the Re-Transmitted Message Flag (-KSC,RMF) is set until the first repeated message has been transmitted.

Ensuing messages follow as normal, starting from the revised sequence number.

d. Position Status Request (See FIG. 3)

The signal -BCC.PSF (Position Status Request Flag) is made false by the BCC when a Position Status Request is received. The signals -RTC.Bϕ through B5 convey the number of the Position to be interrogated.

e. Signals From TOTF (See FIG. 3)

The signal -SSC.BCA is derived via relay contacts in the System Switchover Circuit and is true when the copy is active.

The system reset signal, CCFD.SRS is derived via relay contacts in the Configuration Control and Flash Distribution Circuit. The contacts are open when resetting is required.

Figure 4:
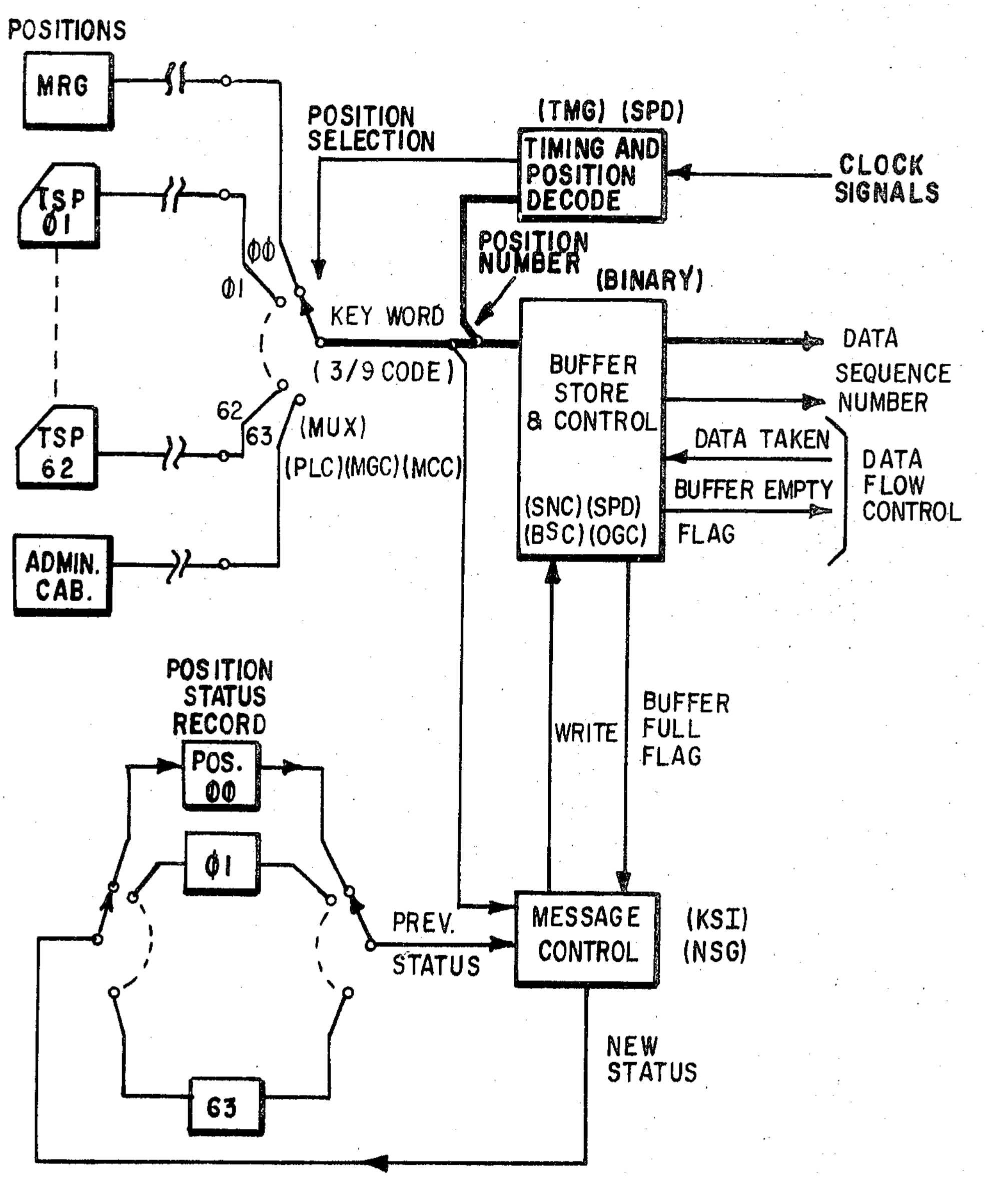
FIG. 4 is an overview diagram of the key scanner.

Internal Functions Of The KSC a. Overview (See FIG. 4)

The Overview Diagram illustrates the principal functions of the KSC. The Positions are scanned in numerical sequence continuously, each scan consisting of 64 frames of 208.3 μs duration each. During each frame period, the key-bus signals from the currently selected position are examined together with a status record (Position Status Record) for that Position. The Message Control hardware then determines whether or not a message is to be written in the buffer and up-dates the status record accordingly. If a message is required and the buffer is not full (i.e., Buffer-Full Flag is flase) the Key Word and Current Position number (in binary) are gated in to the next available buffer register.

Messages are read by the RTC from the buffer synchronously but independently of the rate at which they are written, the function of the buffer being to accommodate the varying rate of operation of keys.

Figure 5:
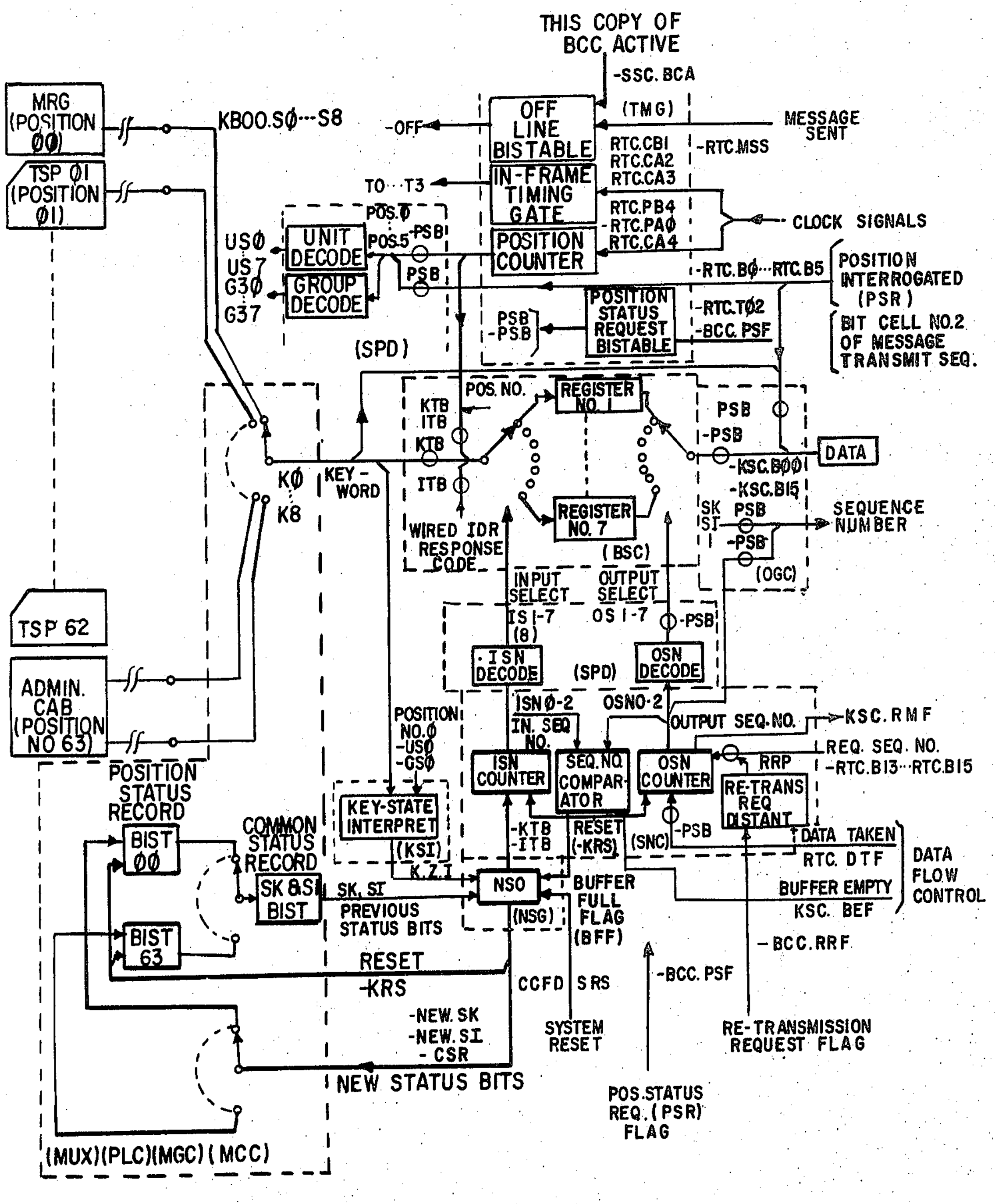
FIG. 5 is an overall block diagram of the key scanner.

Block Diagram (see FIG. 5)

The Overall Block Diagram shows the functions of the KSC in detail including maintenance functions.

1. Timing and Position Decode ([TMG]and [SPD]):

The Position Counter is a six stage binary counter and counts continuously upward (ϕϕ to 63) in steps of 208. μs (ie, 1 frame interval). The outputs are decoded by the Position Decode logic into Position Group and Unit Select signals (GS*p* and US*q* where Position Group and Unit Select signals (GS*p* and US*q* where Position Number = 8*p*+*q*). Pair combinations of group and unit determine which Position is currently being examined.

The four outputs of the in-frame timing gates are repeated during each frame and provide the four discrete intervals which time all events in the KSC.

2. Status Record & Message Control Hardware (MUX, KSI & NSG):

The Position Status Record consists of two bistables SK and SI per position. The combined. values of SK and SI serve as a record primarity to insure that a particular operation is reported only once. When a given position is accessed, the associated Position Status Record is transferred to the Common Status Record bistables. Simultaneously, the KSI examines the nine-bit Key Word to ascertain the current state as follows:

When three or more of the nine bits are true (i.e., a key is depressed) the signal K (key) is made true.

When all bits are false, Z (zero) is made true.

when one of the IOR codes (see table 3/9 code assignments) detected, I is made true.

It should be noted that this applies whether the IOR code is due to a single IOR key or a combination of keys.

The status bits and Z, K and I are compared by the NSG which determines whether or not a message is to be written in the buffer and determines the new values of the status bits. The flow chart of FIG. 6 describes the effects of all combinations. The effects of signals -KTB and -ITB (Key Word to Buffer and IOR pattern to Buffer) are also implied on the flow chart. However, if the buffer store is full (i.e., BFF is true), -ITB and -KTB are inhibited and the status bits are written back unchanged in the Position Status Record bistables. The Reset signal (-KRS) is distributed to all Position Status Record bistables, by-passing the selection signals. When -KRS goes false, all SK and SI bits are set to zero.

Buffer Store (BSC):

The buffer store consists of seven 15-bit registers with independent output and input selection. The input selector is stepped on immediately after data have been written in the store. I.e. in the interval between messages, the selected register is the next register to be written in. Similarly, the output selector accesses the next register to be read from and is stepped on immediately after each word has been read.

For normal messages, RTB gates data from the Key and Position buses to the currently selected register. In the case of IOR messages, the internally wired IOR code is admitted instead of the Key Word.

4. Sequence Numbers Counters, Decoders and Comparator (SNC SPD): The Input Sequence Number (ISN) counter is a three stage binary counter which counts upwards from 1 through 7. When the count reaches 7 the next step returns the count to 1, bypassing zero which is not used. The count is stepped on (after each -ITB or -KTB pulse) each time a message has been written in the buffer.

The Output Sequence Number (OSN) counter is identical with the ISN counter except for the addition of the Re-Transmisssion Request facility. The count is increased (after RTC.DTF goes true) every time a message has been read from the buffer.

When the Re-Transmission Request signal is active, the Requested Sequence Number is gated to the OSN counter, thereby overwriting the current value. As RRF commences at the end of a receive sequence in the RTC, the next message transmitted will be that having the Sequence Number just requested. The Re-Transmitted Message Flag (-RSC.RMF) is made false when RRF commences and goes true (on receipt of RTC.DTF) after the RTC has transmitted the first repeated message.

ISN and OSN are decoded by separate three-bit binary decoders to give the seven input and the seven output select signals Is1-7 and OS1-7 respectively. These signalg open the gates of the correspondingly selected registers.

ISN and OSN are compared by the comparator and if found to be equal following a "write" instruction, the buffer is declared to be full and BFF is set. Similarly if ISN equals OSN following a "read" sequence, the buffer is declared empty and KSC.BEF is set.

The reset signal, when activated, sets the sequence numbers to unity and sets the Buffer Empty bistable.

5. Off-Line Bistable ([TMG]):

Each copy of the KSC has two modes of operation, namely active and inactive (off-line), depending on which copy of the TOCF and data link is handling normal data. The inactive copy os KSC inhibits the writing of messages in the buffer. Otherwise both copies function normally, including the normal updating of the status record.

When the signal -SSC.BCA goes false, the KSC goes active at the start of the next complete frame and writing is again permitted. When the signal goes true, the KSC delays until the end of the next RTC transmit sequence (ie, about 13 ms later) and then goes off-line. This results in an overlap period of approximately 1 full Position scan during which bot copies of KSC are active. The overlap is provided to allow for maximum stagger between the Position scanners in the two copies of KSC.

6. Position Status Request Bistable ([TMG]):

The Position Status Request permits the maintenance software to examine the 9-wire bus from any requested Position together with the associated status bits (SK & SI).

When -BCC.PSF has gone false, the Position Status Request bistable is set at the start of bit cell Tϕ2 early during the RTC transmit sequence (ie before the RTC has started to read data). The bistable is reset in the same way during the next RTC transmit sequence. The signals from the bistable are PSB and -PSB and they produce several effects. In the [SPD], PSB (and -PSB) substitutes the Position number of the Position to be interrogated in place of the normal Position number. This forces the Position scanner to the required Position, admitting the Key-Word to main data highway and to the secondary highway which by-passes the buffer. In the [OGC], the Key-Word and the requested Position number are then allowed (via the PSB gate) on the main data lines to the RTC. These lines now remain steady for the duration of the PSR.

In a similar fashion, SK and SI are admitted (via the [OGC]) to the Sequence Number lines in place of the normal sequence number.

As the RTC does not distinguish between the PSR and other data messages, RTC.DTF will occur as normal at the end of the transmit sequence. Therefore in the [SNC]-PSB prevents DTF from stepping the OSN counter.

PSB also inhibits up-dating of the status word and writing of messages in the buffer.

Detailed Logic Description a. Multiplexer (MUX)

Figure 10:
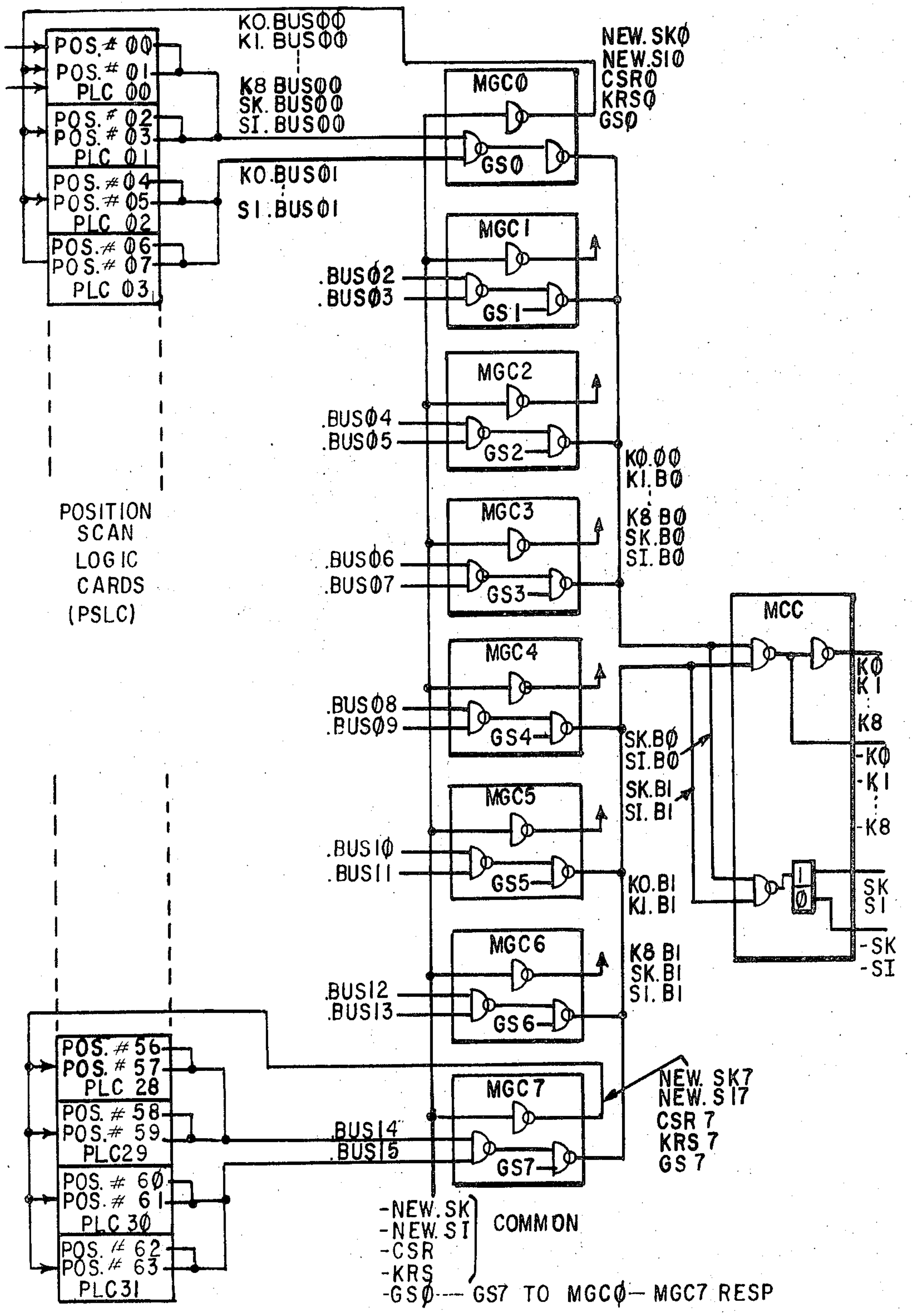
FIG. 10 is a block diagram of a position multiplexer.

The block diagram of FIG. 10 (MUX) shows the arrangement of the Position multiplexer. The bracketed mnemonics refer to the circuits on FIG. 11. As can be seen the Positions are multiplexed in groups of eight, each group being accommodated by four Position Logic Cards, (PLC) each having circuits for two positions and one Multiplexer Group Circuit (MGC). The associated Group Select signals, GSϕ—7, are each fed to a group of PLC and again to the associated MGC, thereby providing isolation under certain fault conditions. Singals from the MGC to the PLC are, likewise, distributed in groups of eight, thus providing further isolation between groups.

The eight sets of outputs from the MGC are combined in logic OR gates feeding the main data highway to the common logic.

Figure 11:
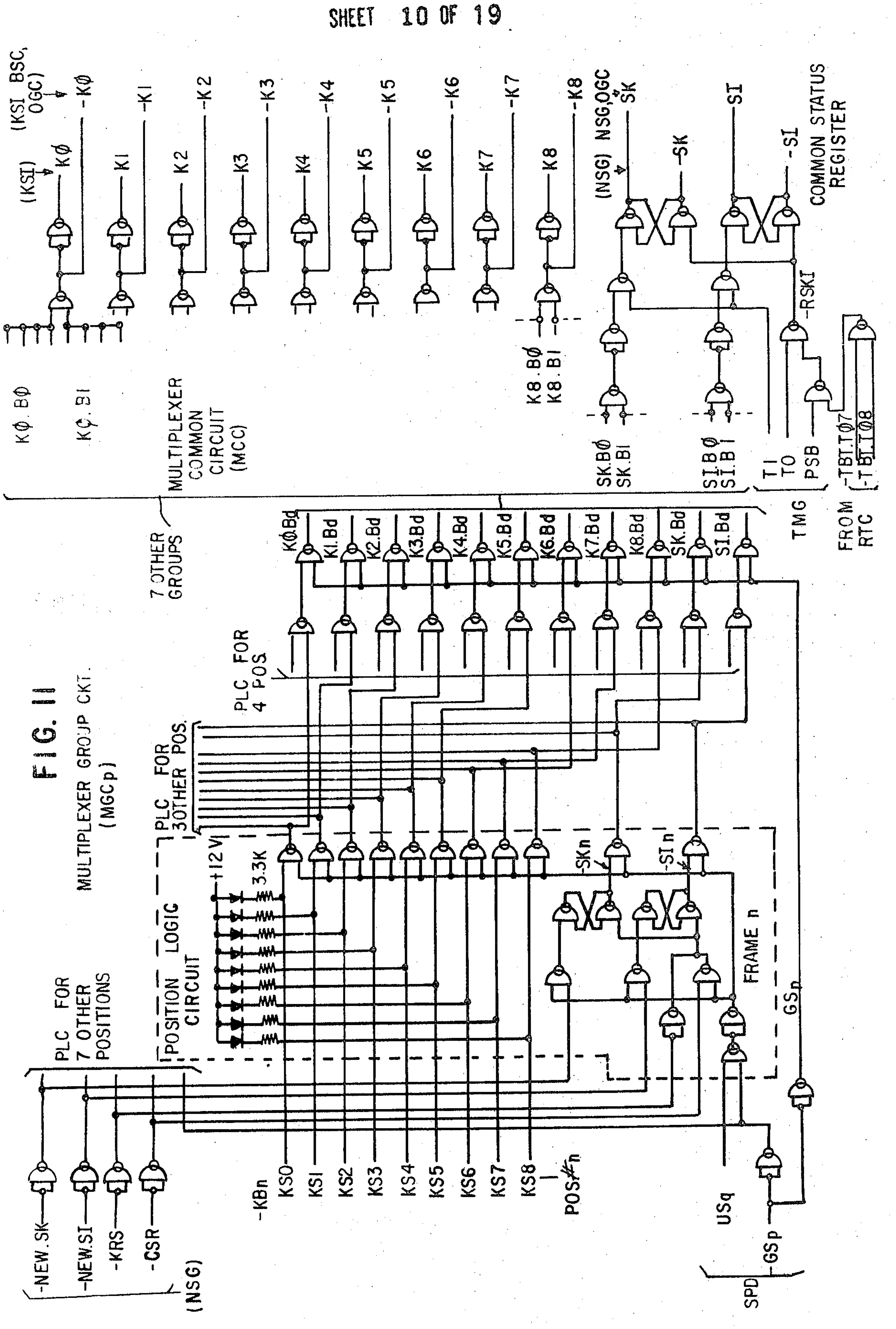
FIG. 11 is a more detailed functional block diagram of a position multiplexer.
Figure 19:
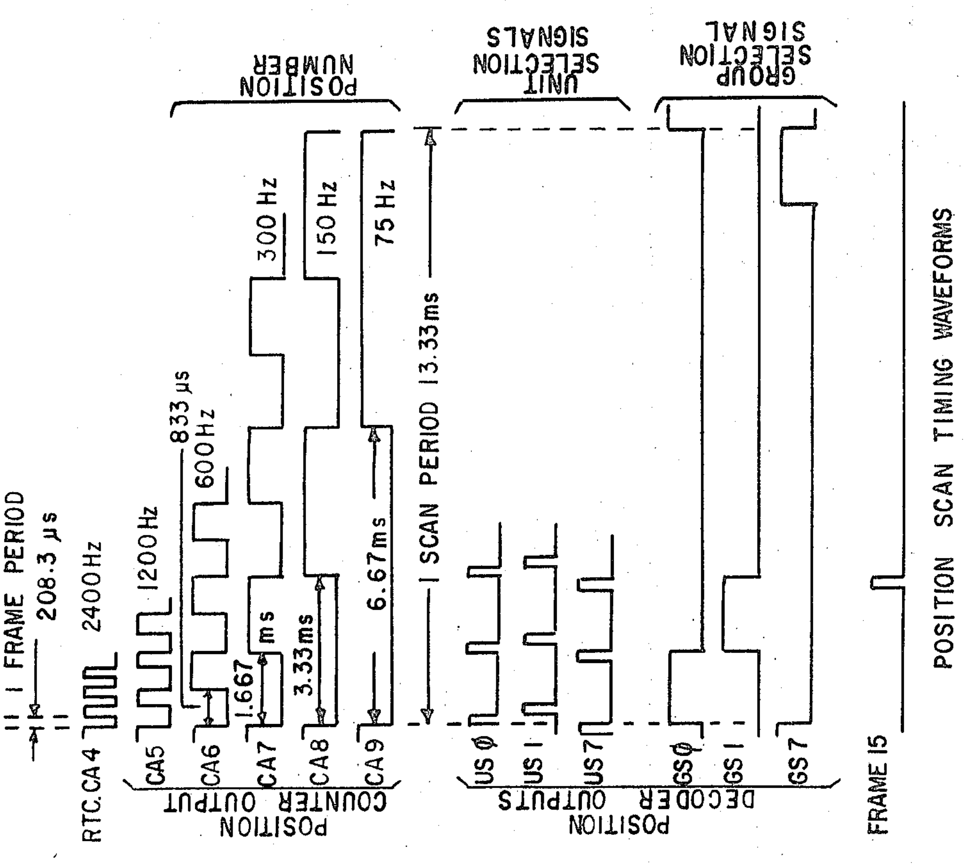

1. Position Logic Circuit (PLC ϕϕ -31):

One of the two circuits of a Positions Logic Card PLC is shown on FIG. 11, left. Each card accomodates two Positions, the signals from which are prefixed, -KBn and -KBn+1. All other signals are internal to the KSC. Each Key-Bus lead is referenced to the +12-V supply via a resistor and diode. The diodes are provided to prevent interaction between the two copies when power to one copy is off. The signals (NEW.SKp, NEW.SIp, KRSp, CSRp and GSp) bearing the suffix *p*, are group signals distributed by the group circuits (MGCp) and are common to each group of four PLC. (8 positions) Signals (USq and USq+1) bearing the suffix *q* are Unit Select signals. The signal Frame *n* is true when the group and unit select signals GS*p* and US*q* are true. The timing diagram of FIG. 19 illustrates the case where GS1 and US7 are gated together to give the signal FRAME 15 which occurs once during each complete scan as do all 64 frame signals. In general, $n=8p+q$ and all permutations of *p* and *q* are used to uniquely select all Positions sequentially during each scan. The signal FRAME *n* gates the Key-bus signals from Position *n* and the signals from Position Status bistables to the output bus lines. FRAME *n* also opens the input gates to the Position Status bistables. Thus, the gates are open for one frame period. The signals CSR, NEW.SK and NEW.SI to the input gate of the bistables remain false until the In-frame Time interval T2 thus leaving the bistable contents unchanged. Meanwhile, the contents are copied in the Common Status bistables in the MCC. In time T2, CSR (Clear Status Register) goes true and resets the bistables (SK=SI=$\phi$). Then in time T3, the signals NEW.SK and NEW.SI are allowed to assume their respective states which are then copied in the bistables and stored until time T2 of frame $n$, one scan period later. The reset signal KRSp, although distributed on a group basis by the MGC is independent of the frame signals and reset all Position Status bistables unconditionally in time T$\phi$ when the System Reset contacts are open.

2. Multiplexer Group Circuit (MGC$\phi$–7):

The multiplexer group circuit is shown on FIG. 11, center.

Each of the input gates provides busing for the respective group of four PLC (8 Positions). The group Select signl to the second rank of gates is repeated here to provide some isolation under fault conditions, i.e., to give better resolution of faults affecting particular busing levels.

The signals -NEW.SK, -NEW.SI, -CSR and -KRS are common to all eight MGC and the gates fed from these signals provide the group distribution.

3. Multiplexer Common Circuit(MCC):

The MCC is shown on FIG. 11, right. The nine identical pairs of gates provide the final stage of multiplexing and the outputs are Key Word lines to the Report field inputs of the buffer.

Figure 22:
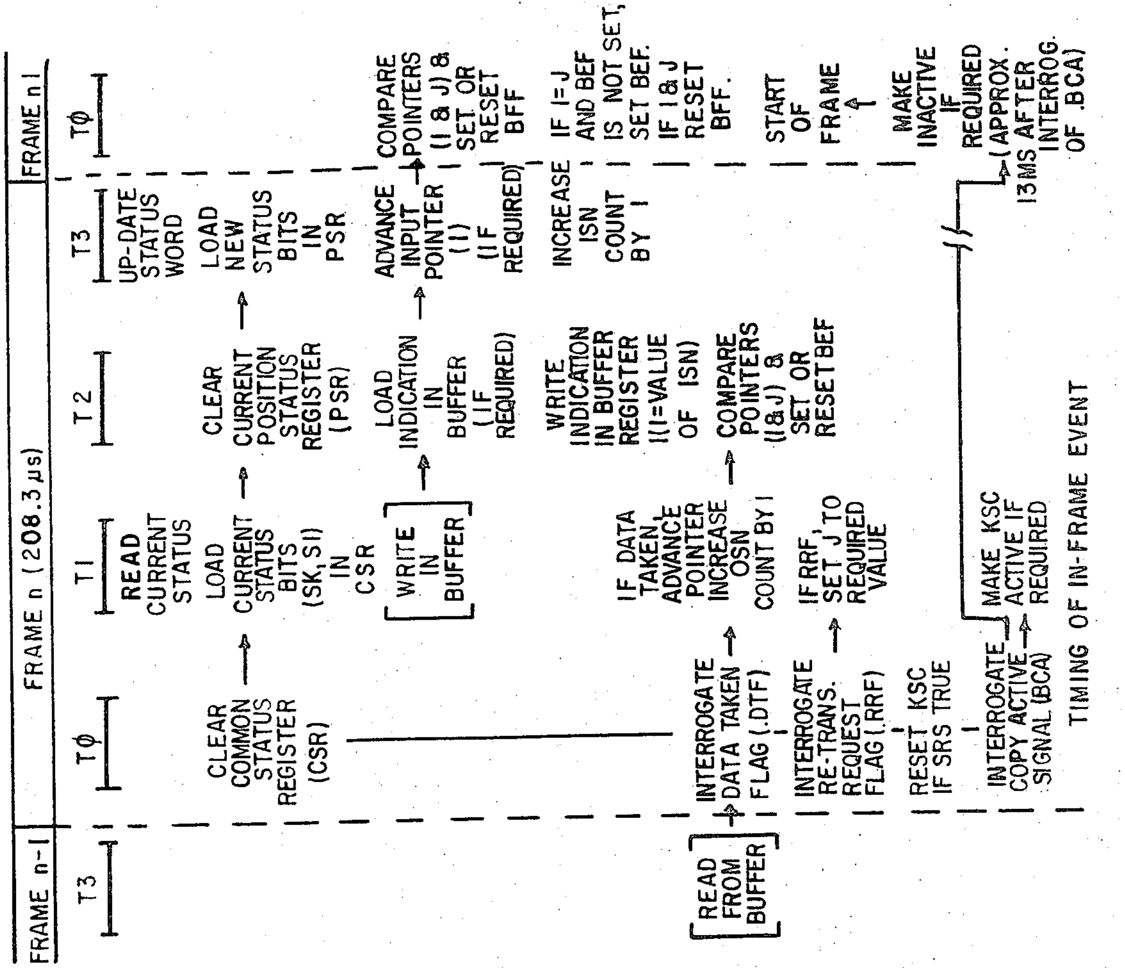

The common Status bistables are reset in time T$\phi$ and loaded in time T1 with the status bits from the currently selected Position. The four-beat transfer of data from the Position Status bistables to the current Status bistables and from the NSG back to the Position Status bistables is described pictorially on FIG. 22.

b. Key State Interpreter (KSI)

Figure 12:
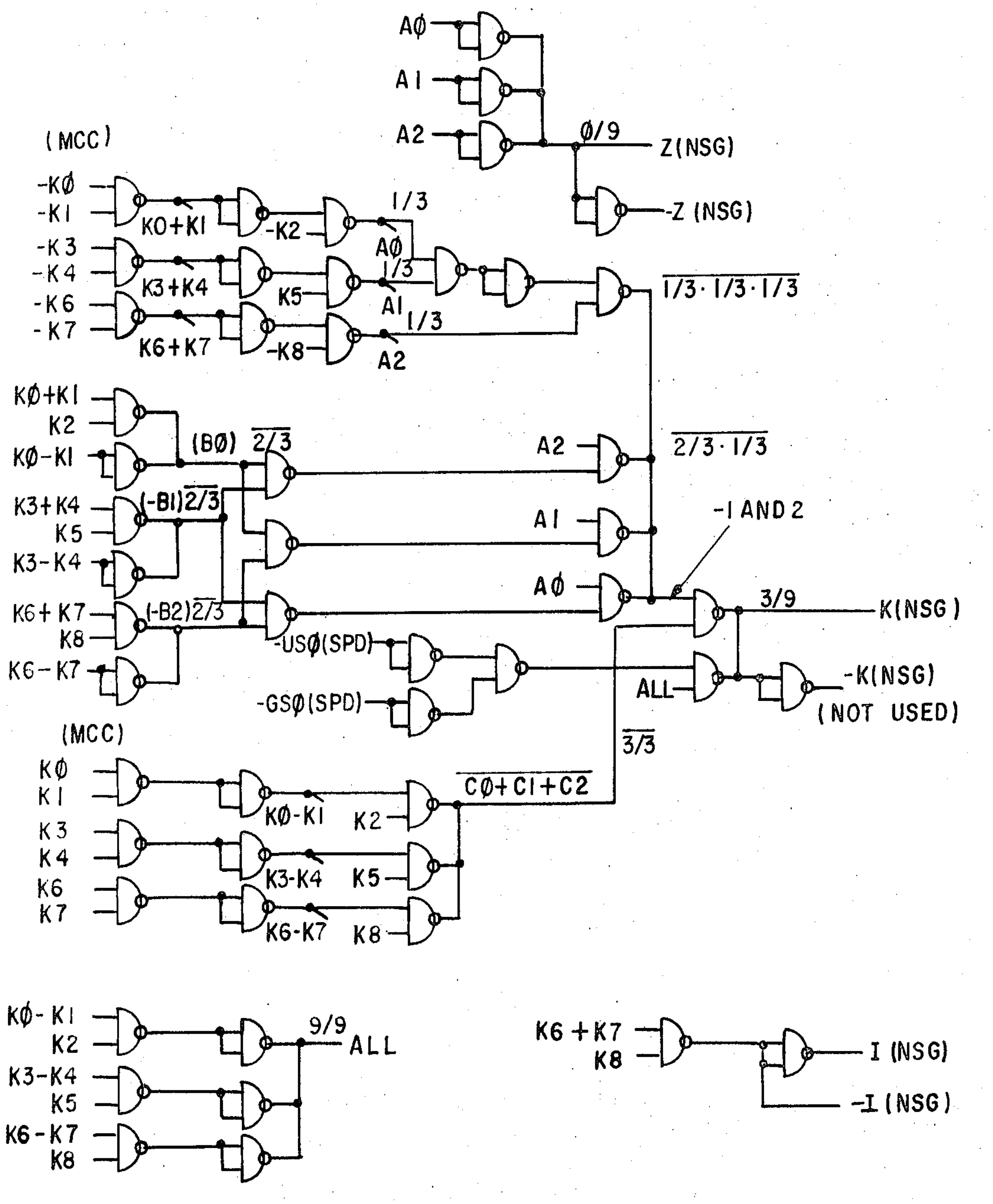

The KSI is shown on FIG. 12.

The KSI examines the 9-bit Key-word and determines one or more of three categories for the states of the bits. These categories are as follows:

1. all bits are zeros.
2. three or more bits are ones.
3. The bits form an IOR code (see table 3/9 code assignments).

The states of the output signals Z, K and I (zero, key and IOR key) correspond to the truth or falsity of categories (1), (2) and (3) respectively.

The logic for determining the signal K is based on the following method.

If the Key Word signals (K$\phi$–K8) are considered in three groups of three bits, then K is true when:

1. One bit is true in each of the three groups.

or

2. One bit is true in one group and two bits are true in one of the other groups.

or

3. All three bits are true in one group. Thus, putting:

$A\phi=K\phi+K1+K2$, $A1=K3+K4+K5$, $A2=K6+K7+K8$ $B\phi=K\phi\cdot K1+K\phi\cdot K2+K1\cdot K2$ $B1=K3\cdot K4+K3\cdot K5+K4\cdot K5$ $B2+K6\cdot K7+K6\cdot K8+K7\cdot K8$ $C\phi=K\phi\cdot K1\cdot K2, C1=K3\cdot K4\cdot K5, C2=K6\cdot K7\cdot K8$ and putting $P=A\phi\cdot A1\cdot A2$--(i.e., case (1) above)

$Q=A\phi(B1+B2)+A1(B\phi+B3)+A2(B2+B3)$ –(-case(2))

and $R=C\phi+C1+C2$ --- (case (3))

Then $K=P+Q+R$

The signals A$\phi$, B$\phi$, etc. are indicated on the diagram. The signal Z is true when A$\phi$, A1 and A2 are false, i.e., when all Key-bus bites are zero. By referring to the 3/9 code assignments table it can be seen that all the codes in which bits K8 and K6 are true or bits K8 and K7 are true are IOR codes. Thus, $I=K8\ (K6+K7)$.

In a given Traffic Office there may be fewer than 62 TSP's. Therefore, provision is made so that only the requisite number of PLC and MGC cards need be supplied. When the scanner selects a Position number for which there are no cards, all the Key-Word bits are unity. The signal ALL is true only when all nine bits are true. All is used to inhibit K, thereby preventing messages from non-existent Positions. However, in the case of Position $\phi\phi$ (the MRG), indications are permitted even when all nine bits are true. This is achieved by the gating of -US$\phi$ and -GS$\phi$.

The need for distinguishing between the case when three or more Key-bus bits are true and the case when fewer than three bits are true arises from the stagger between successive contact closures when a key is being depressed. This stagger could otherwise result in reports containing only one or two ONES instead of the requisite three.

(c) New Status Word and Message Gating (NSG)

Figure 6:
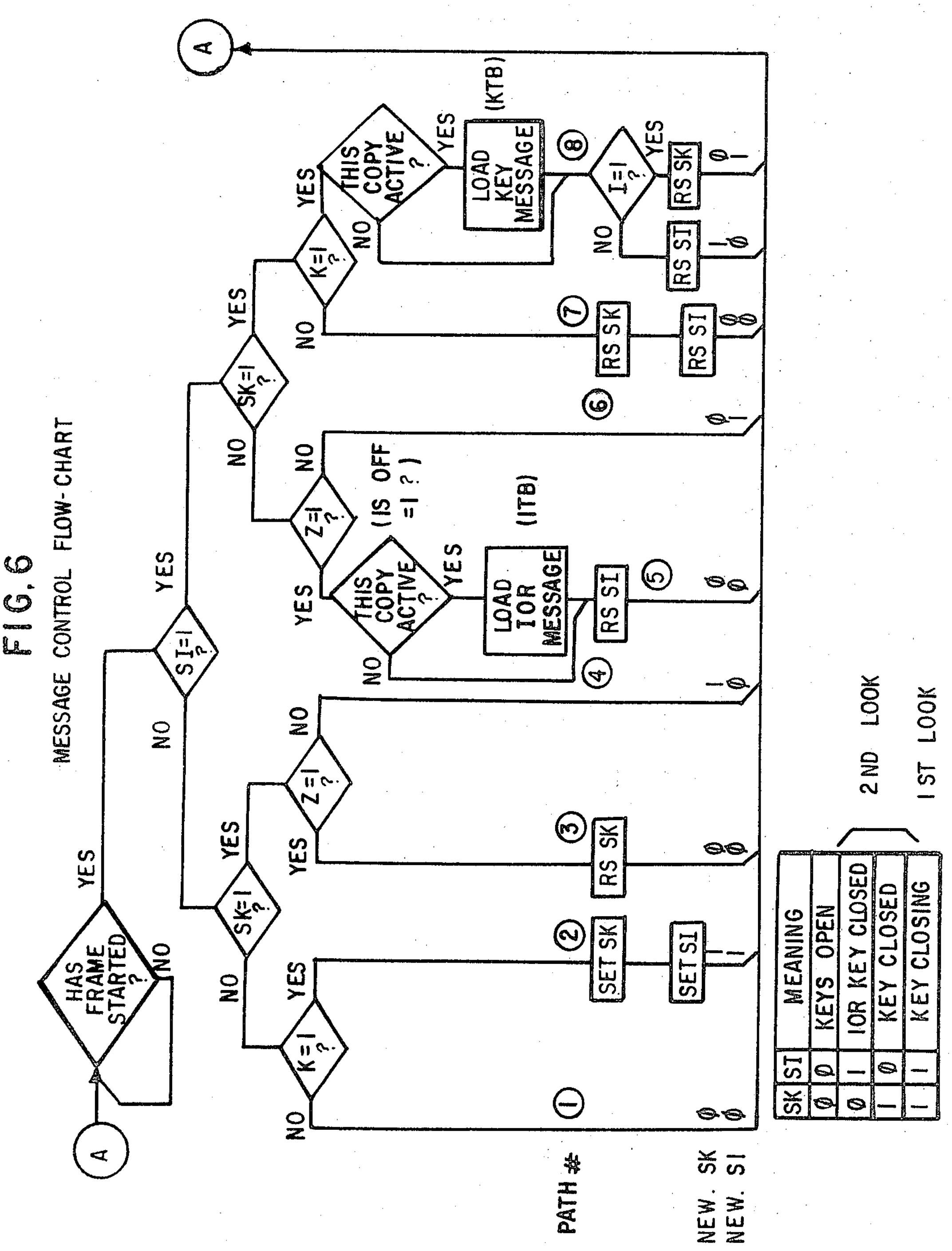
FIGS. 6 and 7 are flowcharts of hardware logic in the key scanner.

The NSG is shown on FIG. 13 and the associated Message Control Flow-chart is shown on FIG. 6. The Flow-chart defines the meanings of the Status bits and the conditions for loading messages in the buffer store. For convenience, eight principal paths in the flow chart have been numbered. The Position Status Record (bits SK and SI) is provided for the following three purposes:

1. To insure only one message per key depression
2. To permit a key action to be seen twice before it is reported (thus giving some noise immunity).
3. To permit IOR keys to be reported when they cease to be depressed.

The letters K and I of the status bits (SK and SI) loosely correspond to "Key" or "IOR Key" respectively. Beneath the flow-chart is a table which gives simplified meanings of the four permutations of SK and SI. In the table, the term KEY CLOSING means that the key depression has been seen once and has not yet been reported. KEY CLOSED means that the key has been seen two or more times and has been reported.

In the flow-chart, path 1 applies to the case when SK, SI and K are zero, i.e., the case when no keys were depressed during the preceding scan and no keys are depressed during the current scan. When, during a subsequent scan, a key depression is detected (i.e. path 2 on the flowchart) then SK and SI are set. Therefore, during the next scan either path 7 or path 8 is applicable depending on whether or not K is still true. If K is true, then the message is loaded in the buffer and the status record is modified accordingly depending on whether or not the key was an IOR key (i.e. depending on the value of I).

While the key remains depressed, the path followed is either 4 or 6. When the key is released and all contacts have opened either path 3 or path 5 is applicable and followed during the next scan by path 1.

On the Flow-chart, the values of the new status bits at the end of a frame are shown at the lower end of each branch. The logic equations for the new status bits and the message gating signals (KTB & ITB) are shown on FIG. 13.

In time T2, the signal -CSR (Clear Status Register) goes false (and clears the currently selected Position Status Register). In time T3 the new status bits are gated out (to the PS Register). However, both -CSR and the new status bits are inhibited if the buffer is full (i.e. -BFF is false) or if a Position Status Request is being serviced (i.e. -PSB is false). The Message gating signals (-KTB and -ITB) occur in time T2 and are similarly inhibited by -PSB and -BFF. Also, -KTB and -ITB are inhibited in the inactive copy of KSC by the signal -OFF. Thus, in the inactive copy of KSC the up-dating of the status word continues as normal while no messages are written in the buffer.

The KSC reset signal -KRS goes false only during time Tφ SRS is referenced to logic ONE via the collector resistor of gate R when the relay contacts are open and is connected to ground when the contacts are closed.

(d) Timing and Control Circuits (TMG)

The Position Counter (see FIG. 14) is a five-stage free-running binary counter. The L.S. bit of the Position number is derived directly from the signal RTC.CA4. The phase A bistables (outputs -CA4 through -CA9) are clocked by -PRT.PAφ (clock Phase A counter stage φ) while the phase B clock signals are derived from RTC.PB4. The principal waveforms are shown on FIG. 19.

Figure 20:
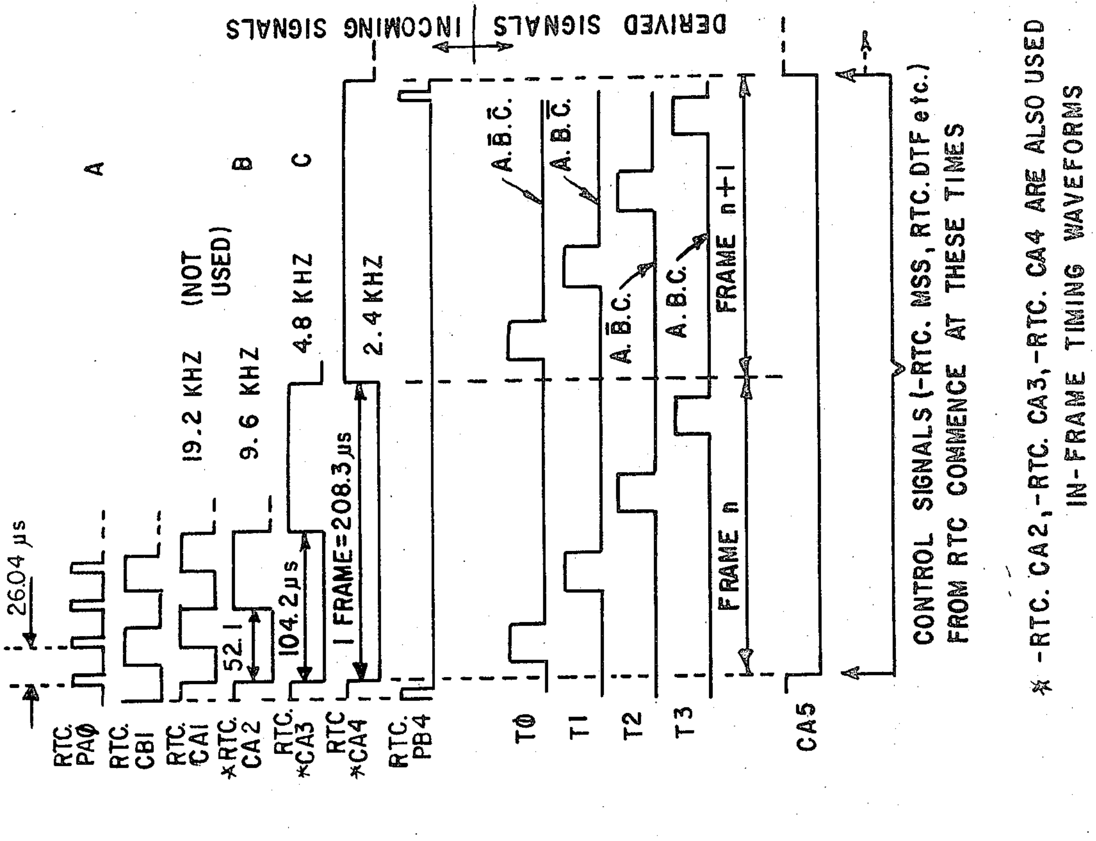

The In-frame timing logic comprises four AND gates which provide the four combinations of RTC.CA2 and RTC.CA3 and which are strobed by RTC.CB1. The waveforms are shown on FIG. 20.

The off-line detection responds to changes in the state of the signal -SSC.BCA. The relay contacts from which -SSC.BCA originates are closed, grounding the signal, in the active copy of the TOC and are open in the off-line copy. When the contacts are open, the signal is referenced to 30 12V via the load resistor of gate Y.

Figure 21:
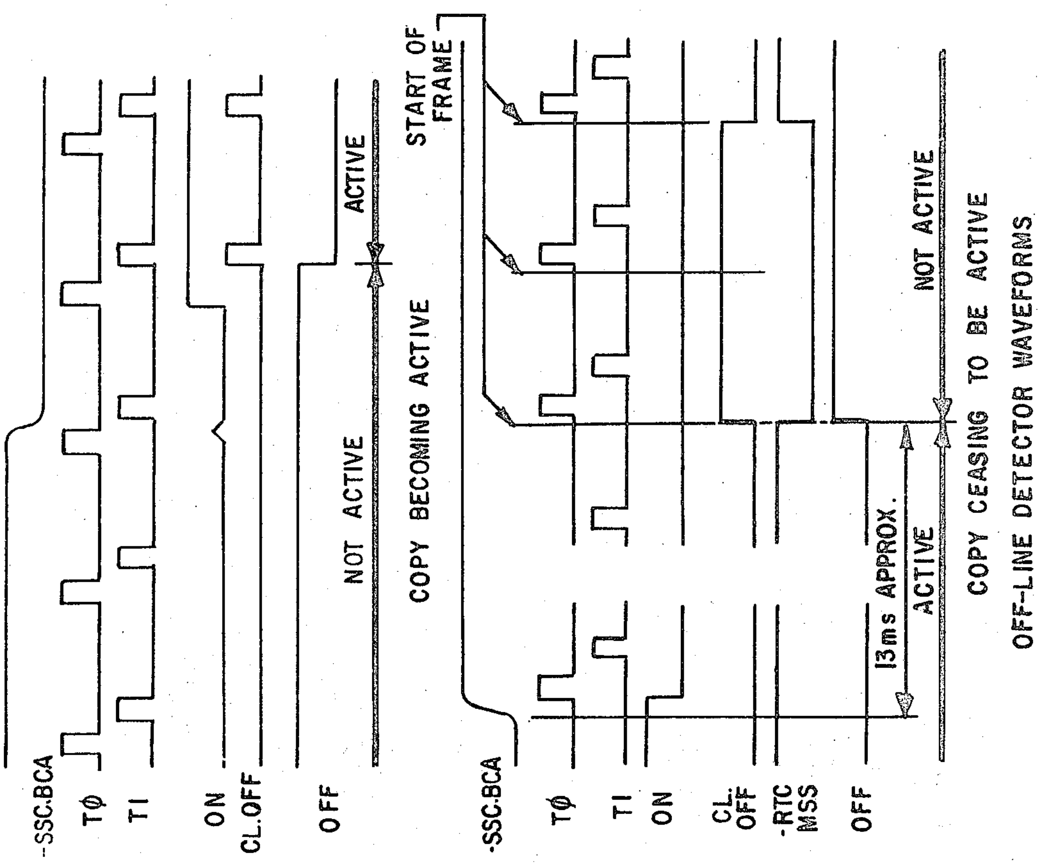
FIGS. 19–22 are timing diagrams of the operation of the key scanner.

The waveforms for the Off-line Detection are shown on FIG. 21. As can be seen, in a copy of the KSC which is becoming active, the signal OFF goes false within one frame interval after -SSC.BCA goes false. Meanwhile, in a copy which is ceasing to be active, OFF goes true approximately 13 ms after -SSC.BCA goes true. As a result, there is an overlap of up to 13 ms during which, both copies of KSC allow messages to be written in the buffer. This is to allow for the stagger that may exist between the two copies of the Position scanner. The position Status Request bistable is clocked at the start of the second bit-cell (-RTC.Tφ2) or the RTC transmission sequence. When -RTC.Tφ2 goes false, the bistable is set or reset depending on the state of the Position Status Flag (-BCC.PSF). The flag signal can change state only at the end of a receive sequence which is over 400μs before the start of bit-cell Tφ2. Thus, when a Position Status Request message is received by the BCC, PSB goes true early during the next transmit sequence.

(e) Sequence Number Counters (SNC)

Figure 15:
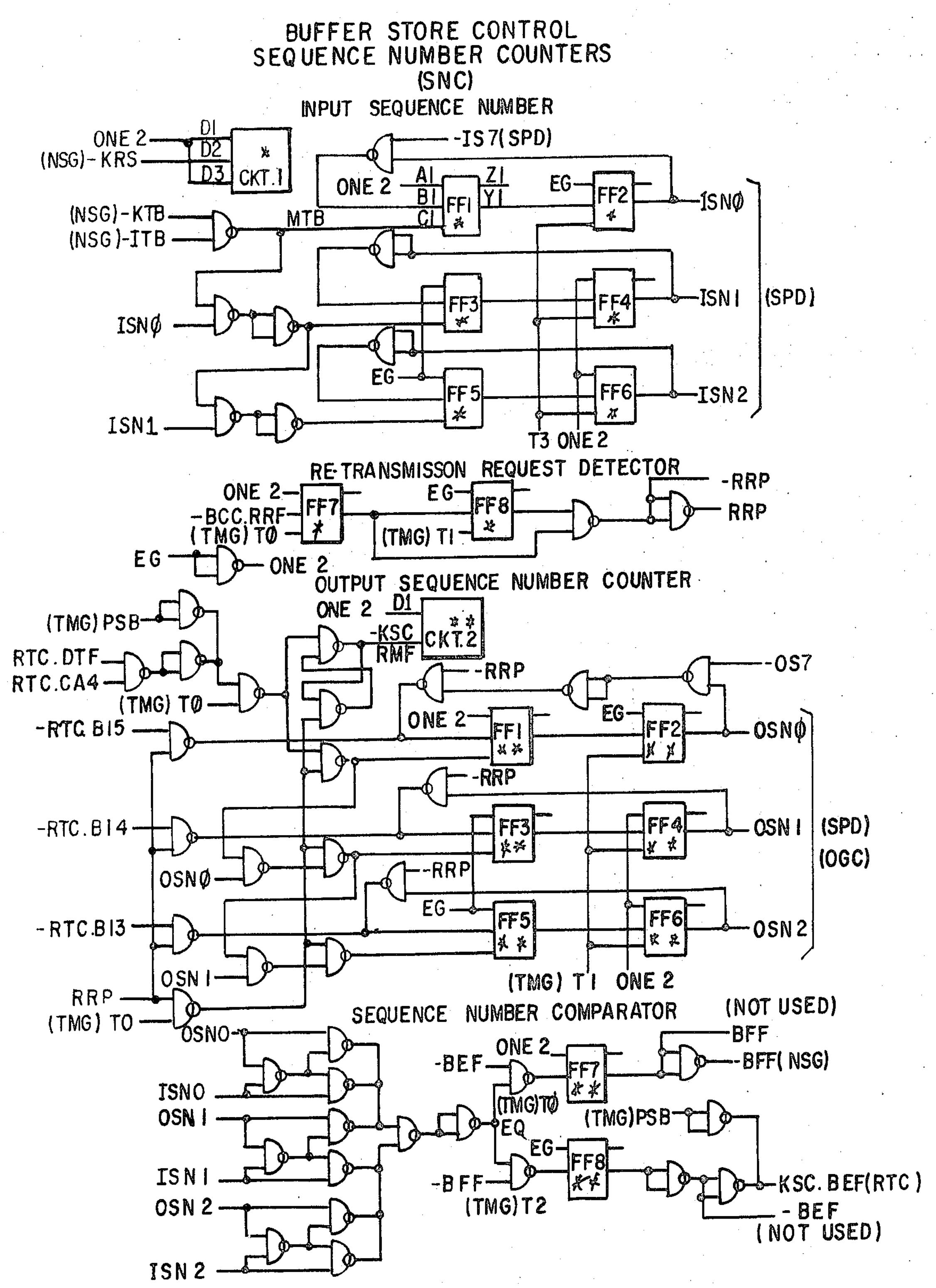

The Sequence Number counters, comparator and ReTransmission Request detector are shown on FIG. 15. The Input Sequence Number counter is similar to the Position counter with the exception that the count skips through zero. The A phase (bistables FF 2, 4 & 6) of the counter is clocked in time T3 while the B phase is clocked by -KTB or -ITB whenever a message is written in the buffer. When the count reaches the binary value of seven (i.e. ISNφ, 1 and 2 all true), -IS7 (Input Select line 7) goes false thereby preventing FF1 from changing state when the next message is written in the buffer. This in turn causes ISNφ to remain true when next T3 resets ISN1 and ISN2.

The Output Sequence Number counter is identical with the ISN counter except for the additional Re-Transmission Request facility.

The phase of the OSN counter is clocked in time T1. The B phase is clocked at the end of a RTC transmit sequence by the Data Taken Flag, RTC.DTF which is strobed by Tφ. However, as RTC.DTF persists for two frame periods, it is gated with RTC.CA4 which is true for only one frame period. Otherwise, the count would be increased by two every time RTC.DTF went true. It should be noted that during a Position Status Request, PSB prevents RTC.DTF from increasing the count. This is necessary since the RTC does not distinguish between a Position Status Request and a normal data transfer. In the Re- Transmission Request Detector, FF7 is set in time Tφ at the start of a Re-Transmission Request, causing RRP (RR Pulse) to go true. The in time T1, FF8 is reset, terminating RRP. When -BCC.RRF again goes true FF7 is reset in time Tφ and FF8 is set in time T1. Thus, RRP is true from the start of Tφ until the start of T1 at the beginning of the Re-Transmission Request and is not repeated until -BCC.RRF has gone true and then false again. While RRP is true, the Sequence number (signals -RTC.B15 through B13) of the message to be repeated, is gated to the B phase inputs (to FF1, 3 & 5), while the recirculated A phase signals OSNφ through 2 are blocked by -RRP.

The Sequence number is gated to the bistables in time T$\phi$ and, at the same time, the Re-Transmitted Message Flag bistable is set, i.e. -KSC-RMF goes false. At the end of the next RTC tansmit sequence, RTC.DTF resets the bistable, Thus, the RMF bit is set during only the first message transfer following a Re-Transmission Request. The Sequence Number Comparator comprises the Comparator itself and the Buffer Empty and Buffer Full bistables. If the Sequence Numbers do not match, then neither bistable is set. If, now, a message is written in the last available register of the buffer, ISN will be increased in time T3 to the same value as OSN. Therefore, in time T$\phi$, FF7 will be set making the Buffer Full Flag true.

In the same way, when the Sequence Numbers become equal following a transfer of data to the RTC, and since OSN changes in time T1, then FF8 will bes set in time T2. I.e. the Buffer Empty Flag (KSC.BEF) will go true.

Figure 7:
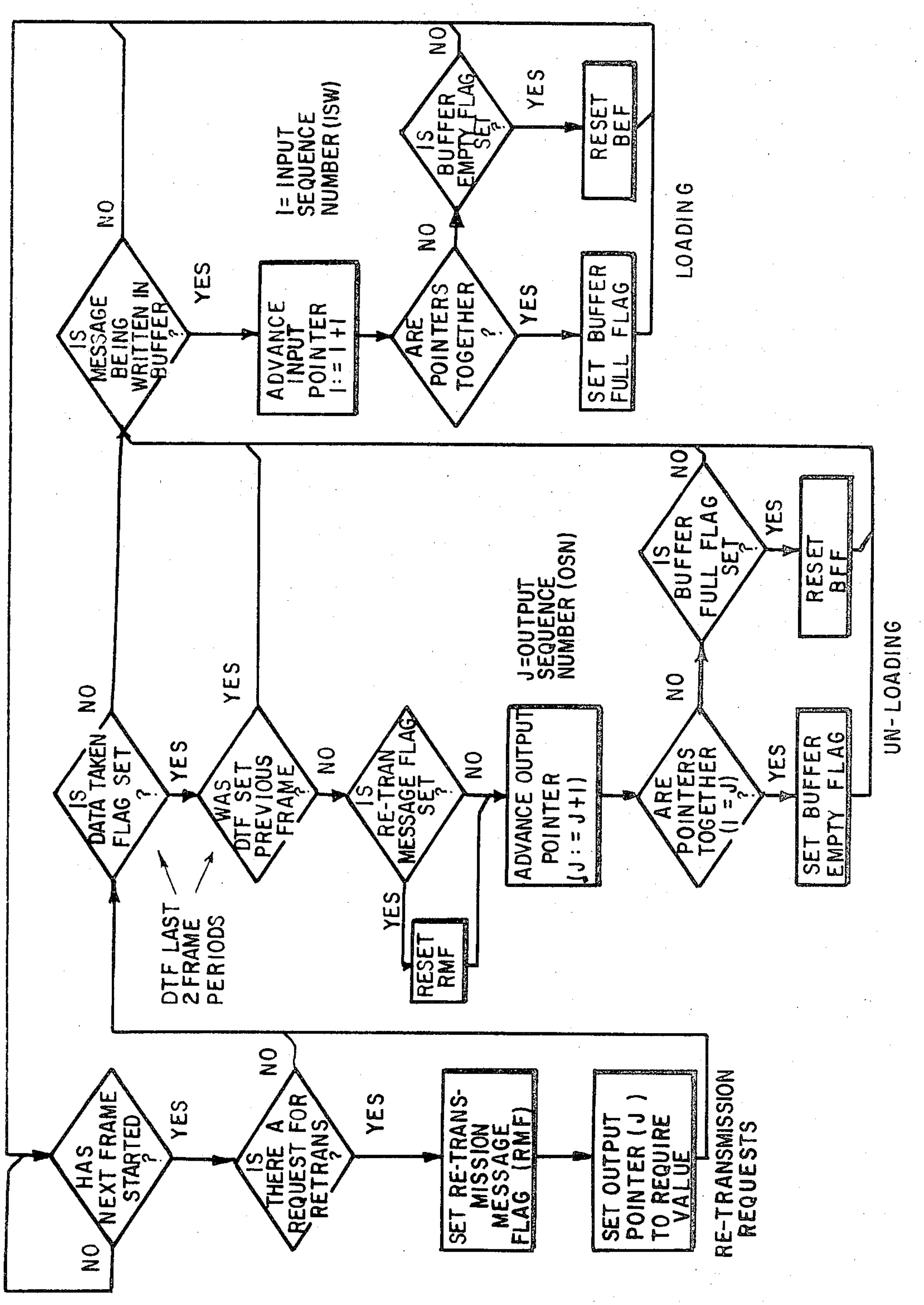

If a Position Status Request is received when the Buffer is empty, PSB inhibits KSC.BEF, thereby insuring that the RTC will read from the KSC. The sequence and timing of buffer store control events are shown (WRITE AND READ) on Page 3.F.120, while the Flow Chart of FIG. 7 defines the automous functions of the buffer.

Figure 16:
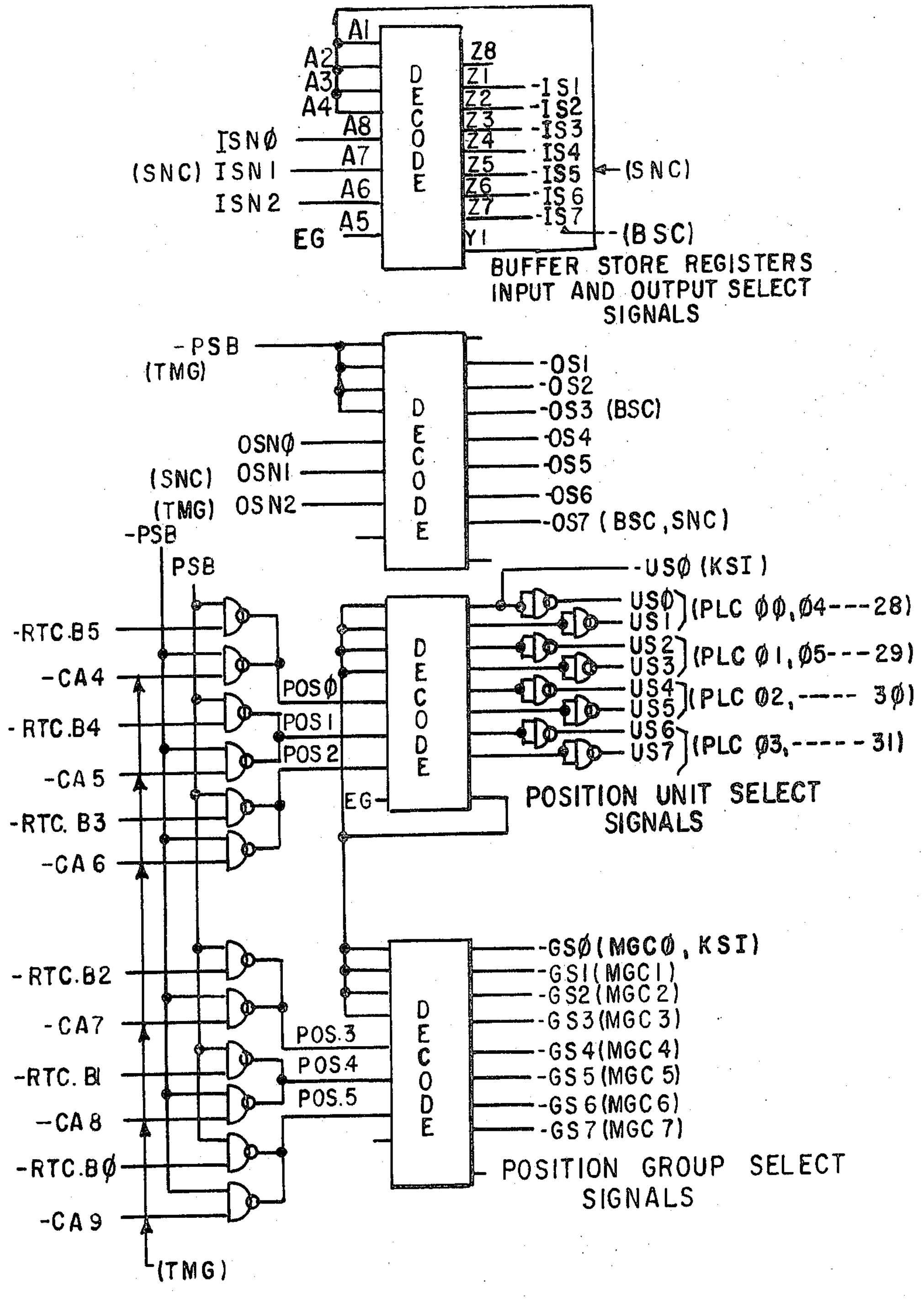

(f) The Sequence and Position Number Decoder (SPD) The SPD is shown on FIG. 16. CKT1 through 4 are three-bit binary decoders.

The ISN (Bits ISN$\phi$ through 2) is decoded by CKT1. ISN (buffer Input Selection signal n) is false when the binary value is ISN=n.

OSN is decoded in exactly the same way by CKT2 with the exception that the output signals are inhibited by -PSB. The reason for this is covered in the description of the OGC.

CKT3 &CKT4 decode the Position number to give the Unit and Group Select signals. The position bits, POS$\phi$ through 5 are numbered in order of bit significance. NOrmally, i.e. with PSB false and -PSB true, the Position number is gated to the decoders from the Position counter, (i.e. signals -RTC.CA4 through -CA9). However, during a Position Status Request (PSB true), the number (signals -RTC.B5 through B$\phi$) of the Position to be interrogated is substituted for the normal number and forces the selection of the required Position.

(g) Buffer Store Circuit (BSC)

One register of the buffer store and the associated selection gates are shown on FIG. 17. Normal key messages are conveyed to the A inputs (A1, A2, etc.) of all seven registers, while IOR messages are conveyed to the B inputs. The signals (-CA4 through -CA9) for the Position field are the same in both cases. The report field in the former case is conveyed by the Key-bus signals (-K5 through -K8): whereas, in the latter case, the IOR phase is permanently wired to the B inputs.

The signal -ISr (Input Select lines 1 through 7) is false for the register currently selected for wiring. When a key message is to be written, -KTB (common to all seven registers) goes false for the duration of time T2. Thus, the inputs to D3 and D2 are true and false respectively and the current Key Word and Position number are gated in from the A inputs. In the Same way, when an IOR message is to be written, -ITB goes false and all the C (individual clock) inputs go true gating in the message via the B inputs.

The data outputs (B$\phi\phi$g through B15g) are bused in two groups. B$\phi\phi$A through B15A form the common outputs of registers 1 through 4. B$\phi\phi$B through B15B are common for registers 5, 6 and 7 and are bused with the outputs of a set of gates in the OGC (described in the next sub-section). When the Output Select signal (-OSN) to a given register is false, the content of that register only is admitted to the associated bus.

(h) The Output Gating Circuit (OGC)

Figure 18:
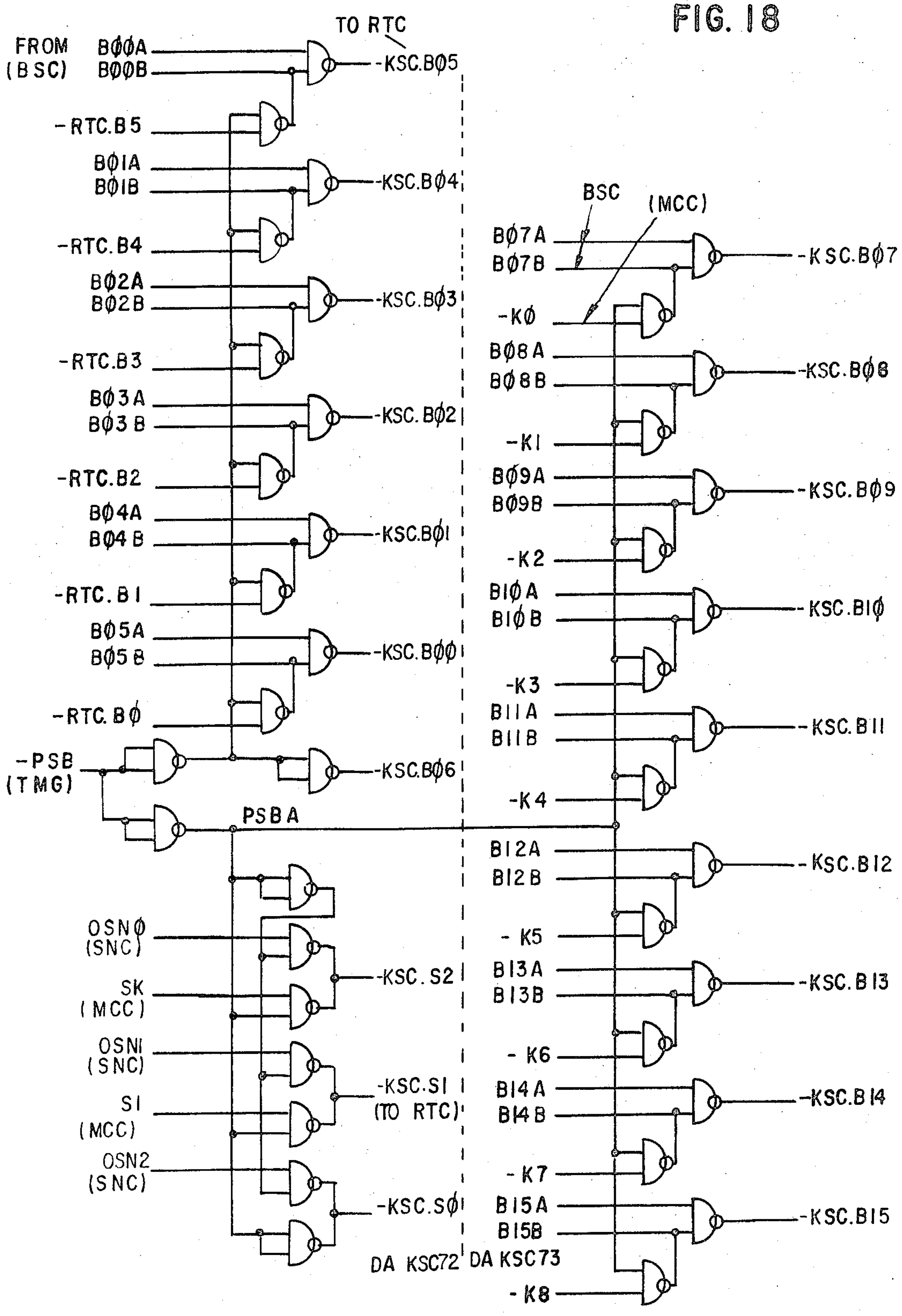

The OGC is shown on FIG. 18. This circuit provides the final gating for the buffer store output buses and presents the current message and its sequence number to the interface. In addition, the OGC provides the required data substitution in response to a Position Status Request.

It was mentioned in the description of the SPD that when PSB is true, the Output Select signals OS1 through 7 are all true. Therefore, the buffer store output gates (internal to the register cards) are all closed. At the same time, the Position Number (-RTC.B5 through B$\phi$) of the Position to be interrogated, together with the Key-word signals (-K$\phi$ through -K8) and current status bits are admitted to the interface.

CONTROL REGISTER CARDS

Figure 23:
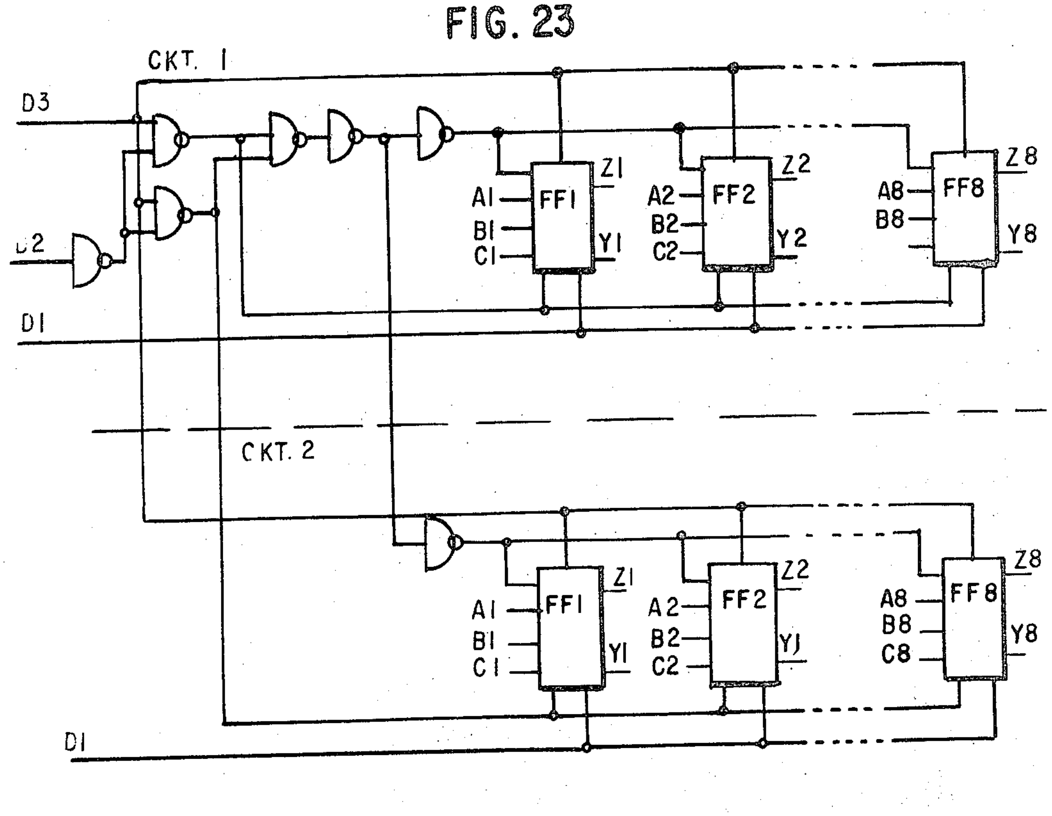
FIGS. 23 and **23*a*** are functional block diagrams of a control register used as a building block in the other circuits.
Figure 23A:
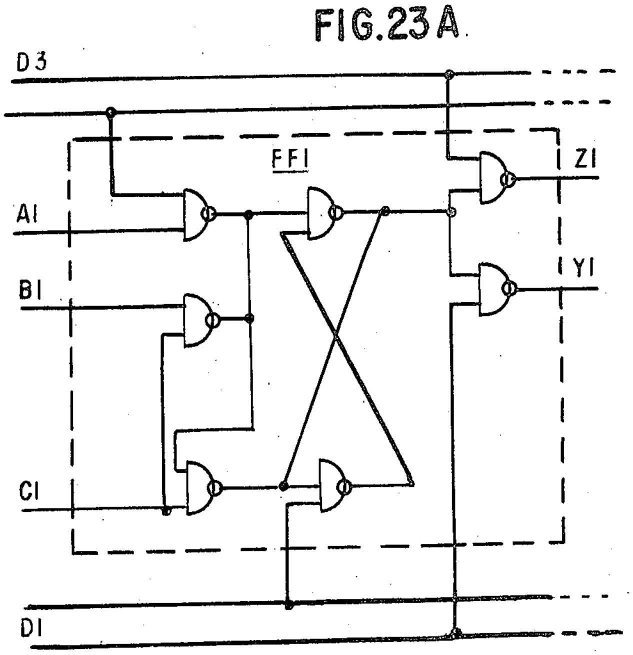

The building block standard cards for use in the system include a control register made up of two-input NAND gates as shown in FIGS. 23 and 23A. There are two interconnected circuits on a card, each of which comprises eight bistable latch type devices designated as flip flops FF1-FF8. The circuit for one of these devices is shown in FIG. 23A. The inputs Ai, Bi,Ci, and outputs Yi and Zi are individual to each bistable device where *i* has values 1 to 8, the input D1 is individual to each of the two circuits on a card but common to all eight bits of a circuit, and inputs D2 and D3 control both the circuits on the card.

The data A*i* are gated in by the coincidence of D2, D3, and are latched in at the trailing edge of D2, D3. The data B*i*, and clock Ci provide control to individual bits. Data B*i* are gated in by the leading edge of clock C*i* and are latched in at the trailing edge of C*i*. The outputs Z*i* are activated by D3 and are fanning out to logic gates. The outputs Y*i* are activated by D1 and they also fan out to logic gates.

Figure 14:
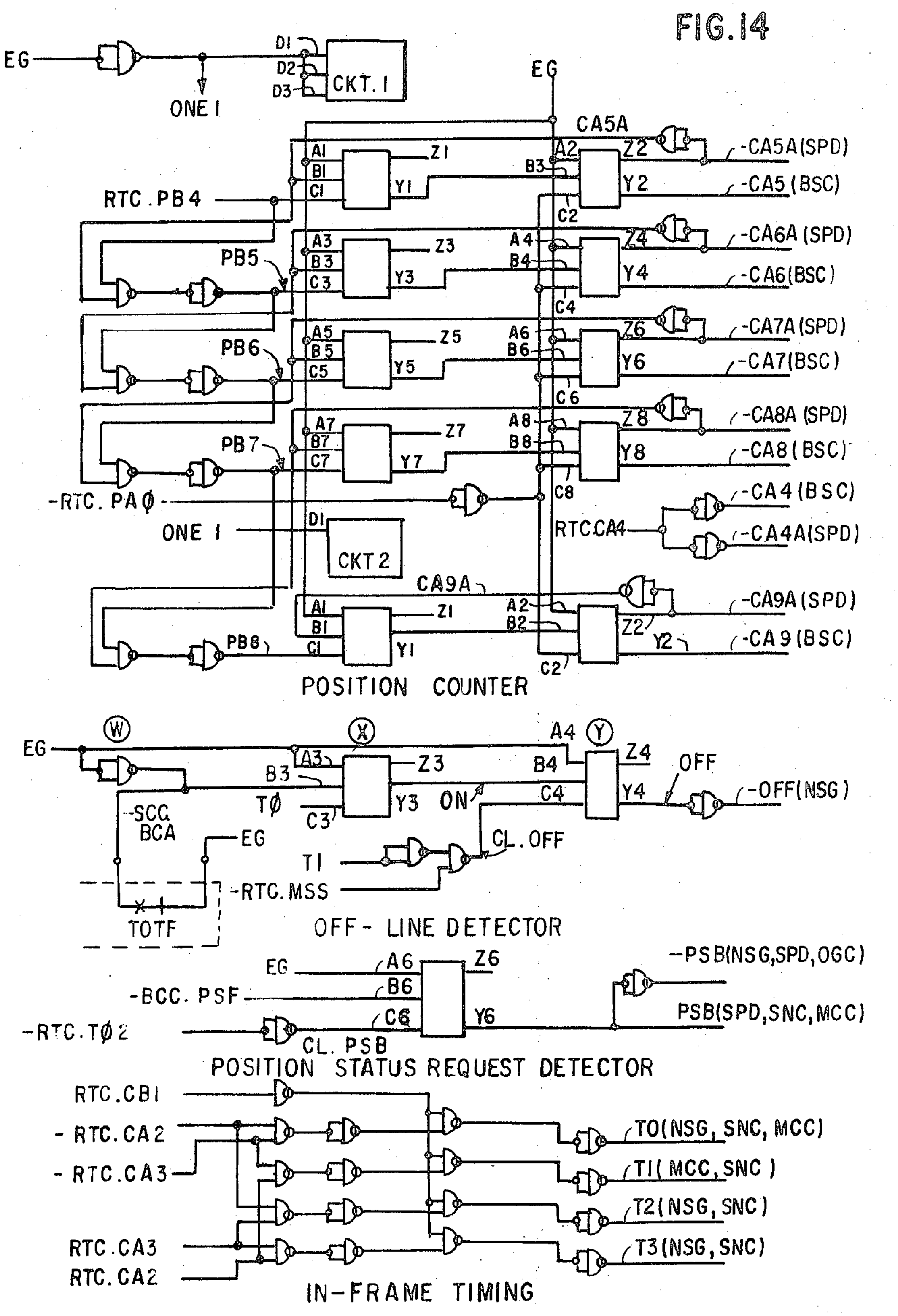

The registers shown in FIGS. 14, 15 and 17 use the circuits of FIG. 23.

HIGH THRESHOLD LOGIC

The logical portions of the sub-systems make use of either a selected group of high speed TTL integrated circuits, which may be from the Sylvania SUHL family; or a

MESSAGE FORMAT

−KSC. BØØ ↓

| | | | | | | | | | | | | | | | |
|---|---|---|---|---|---|---|---|---|---|---|---|---|---|---|---|
| BØ | B1 | B2 | B3 | B4 | B5 | B6 | B7 | B8 | B9 | B1Ø | B11 | B12 | B13 | B14 | B15 |

L.S. BIT → B5; B7 ← KØ

POSITION FIELD (BØ–B5); REPORT FIELD (B7–B15)

−KSC. SØ ↓

| | | |
|---|---|---|
| SØ | S1 | S2 |

L.S. BIT → S2

SEQUENCE NUMBER

INDICATION MESSAGE:

- $B\phi$–B5 = POSITION NUMBER IN BINARY
- B6 = $\phi$
- B7–B15 = KEY WORD OR IOR PHRASE IN 3/9 CODE
- $S\phi$–S2 = SEQUENCE NUMBER IN BINARY (1–7 ONLY)

POSITION STATUS RESPONSE:

- $B\phi$–B5 = POSITION REQUESTED
- B6 = 1
- B7–B15 = KEY WORD OF POSITION INTERROGATED
- S2,S1 = STATUS BITS SK & S1 RESP.
- $S\phi$ = 1 group of high threshold integrated circuits.

The circuits of the Key Scanner, including the control registers of FIG. 23, make use of the high threshold logic.

The high threshold logic integrated circuits are designed for use in high electromechanical noise environments and in the implementation of electronic-to-electromechanical interface circuits. The high noise immunity is the result of the large signal amplitude and the input hysteresis characteristic of the gate circuit. The positive or negative noise margins are a minimum of 6 volts. The family is designed to operate over the temperature range of 0°C to 75°C with a nominal propagation delay of 100 nanoseconds. Only one power supply of +12 volts is required.

The circuit comprises four transistors. The inputs comprise a diode AND gate (for positive logic in which "1" is a positive voltage and a "0" is ground potential), and the transistors provide an inverting amplifier so that the complete circuit is a NAND gate. The first transistor has its emitter connected to the diode gate and its collector coupled via a Zener diode to the base of the second transistor. The second and third transistors each have their emitter connected to the base of the next stage, and the last transistor has its emitter connected to a ground and the output at the collector has a pull up resistor. Resistors and diodes provide bias connections to a +12 volts and ground.

The circuits may be connected together at the output to perform the OR function for 0's. Thus, as shown in FIG. 11 in the group circuit, the outputs from four positions are connected together as an output bus, and the two busses from the eight positions of a group are connected as respective inputs of a group gate, so that when the output from the NAND gate of any position goes to "0" the output of the group gate goes to "1."

What is claimed is:

1. A scanning arrangement for a plurality of units;

each unit having a plurality of switch devices and an N-conductor bus, each switch device having a means which when operated places a given signal condition on M of the N conductors of the bus for its unit;

wherein said scanning arrangement comprises a unit status register with two bistable devices individual to each unit, the states of the combination of the two bistable devices being designated "open," "closing," and "closed," multiplex means including timing means connected to scan the units in time slots in sequence in recurring fixed cycles, with gates enabled by the timing means to couple the signals from the N bus conductors and the state of the two bistable devices of the unit being scanned to common scan circuits;

wherein the common scan circuits include an interpreter and a new status generator, the interpreter having means to check the bus signals for at least M signals to produce a signal "K" and for zero signals to produce a signal "Z" the new status generator having means to compare the signals from the interpreter and the signals from the two bistable devices, the signals from the two bistable devices being for the state to which they were set in the preceding cycle, the new status generator having means including outputs coupled to inputs of the two bistable devices of the unit being scanned via the multiplex means to selectively set the two bistable devices to a new state, which responsive to the preceding state being "open" and "K" not true is "open," responsive to a preceding state "open" and "K" true is "closing," responsive to a preceding state "closing" and "K" not true is "open," responsive to a preceding state "closed" and "Z" not true is "closed," and responsive to a preceding state "closed" and "Z" true is "open;"

message means to produce a message during each cycle in which the preceding state was "closing" and the new state is "closed," said message comprising the signals from the bus and signals from the timing means identifying the time slot of the unit scanned.

2. A scanning arrangement as claimed in claim 1, wherein said switch devices include indication-on-release devices and other devices, wherein the indication-on-release devices use a subset of the M-out-of-N code, the interpreter having means to identify said subset and produce a signal "I," wherein there are two of said "closed" states one being "IOR closed" and the other being "other closed," wherein, the new status generator means to selectively set the two bistable devices includes means responsive to the preceding state being "closing" and "K" true to produce a new state which is either "IOR closed" or "other closed" depending respectively upon whether "I" is true or not true;

wherein said message means includes means to produce a message during each cycle in which the preceding state was "IOR closed" and the new state is "open," the last said message comprising signals for a code indicating release and signals from the timing means identifying the time slot of the unit scanned.

3. A scanning arrangement as claimed in claim 2, wherein for some time slots the units are not equipped, the multiplex means having connections to produce signals for all N conductors during the time slots for which units are not equipped, wherein the interpreter includes means to produce a signal indicating "all true" in response to all N signals being true, and the new status generator includes means to inhibit the signal "K" in response to the signal "all true," whereby no messages are produced for unequipped units.

4. A scanning arrangement as claimed in claim 2, wherein said common scan circuits include a common status register with two bistable devices corresponding to the bistable devices of the unit status register, and in-frame timing means to control a sequence of events for transferring of the state of the unit status register for the unit being scanned to the common status register and setting the unit status register to its new state.

5. A scanning arrangement as claimed in claim 1, further including a buffer store circuit comprising a given number of buffer registers numbered in sequence, means to load each said message into the next buffer register in sequence, there being a transmission circuit for sending the messages in sequence and making the buffer register available as its message is sent, means for determining when all buffer registers have messages to produce a all full flag signal which is used to inhibit changing the state of any of the unit status registers, whereby a message will be loaded for a unit when a buffer register is available if the operation of a switch device continues until then.

6. A scanning arrangement as claimed in claim 5, wherein the scanning arrangement is duplicated with the N-conductor bus of each unit connected to the multiplex means of both of the scanning arrangements, means placing one scanning arrangement on line and the other off line and to changeover from one to the other, both scanning arrangements being operative with means to inhibit loading messages into its buffer store circuit for the off-line scanning arrangement, and means to permit both scanning arrangements to load messages for a given interval during changeover to ensure that messages are loaded for all operations of the switch devices.

7. A scanning arrangement as claimed in claim 5, further including means to receive messages, one received message format being a unit status request identifying the time slot of one unit, means responsive to a unit status request to interrupt the sequential scanning in the multiplex means and to use the time slot identity in the request to enable the multiplex means to gate the bus signals from that unit to the common scan circuits, and to inhibit any change of the unit status register, and means to send a status reply message of the bus signals with a special sequence number, by passing the buffer store circuit.

8. A scanning arrangement as claimed in claim 5, wherein said common scan circuits include a common status register with two bistable devices corresponding to the bistable devices of the unit status register, and in-frame timing means to control a sequence of events for transferring of the state of the unit status register for the unit being scanned to the common status register and setting the unit status register to its new state.

9. A scanning arrangement as claimed in claim 8, wherein said switch devices are manual keys with M sets of contacts for applying a potential to selected M of the N bus conductors.

10. A scanning arrangement as claimed in claim 9, wherein said scanning arrangement is incorporated into a communication switching systems in which said units are operator position circuits.

11. A scanning arrangement as claimed in claim 10, wherein said switch devices include indication-on-release devices and other devices, wherein the indication-on-release devices use a subset of the M-out-of-N code, the interpreter having means to identify said subset and produce a signal "I," wherein there are two of said "closed," states one being "IOR closed" and the other being "other closed," wherein, the new status generator means to selectively set the two bistable devices includes means responsive to the preceding state being "closing" and "K" true to produce a new state which is either "IOR closed" or "other closed" depending respectively upon whether "I" is true or not true;

wherein said message means includes means to produce a message during each cycle in which the preceding state "IOR closed" and the new state is "open," the last said message comprising signals for a code indicating release and signals from the timing means identifying the time slot of the unit scanned.

12. A scanning arrangement as claimed in claim 11, wherein the scanning arrangement is duplicated with the N-conductor bus of each unit connected to the multiplex means of both the scanning arrangements, means placing one scanning arrangement on line and the other off line and to changeover from one to the other, both scanning arrangements being operative with means to inhibit loading messages into its buffer store circuit for the off-line scanning arrangement, and means to permit both scanning arrangements to load messages for a given interval during changeover to ensure that messages are loaded for all operations of the switch devices.

13. A scanning arrangement as claimed in claim 12 further including means to receive messages, one received message format being a unit status request identifying the time slot of one unit, means responsive to a unit status request to interrupt the sequential scanning in the multiplex means and to use the time slot identity in the request to enable the multiplex means to gate the bus signals from that unit to the common scan circuits, and to inhibit any change of the unit status register, and means to send a status reply message of the bus signals with a special sequence number, by passing the buffer store circuit.

14. A scanning arrangement as claimed in claim 13, wherein for some time slots the units are not equipped, the multiplex means having connections to produce signals for all N conductors during the time slots for which units are not equipped, wherein the interpreter includes means to produce a signal indicating "all true" in response to all N signals being true, and the new status generator includes means to inhibit the signal "K" in response to the signal "all true," whereby no messages are produced for unequipped units.

15. A scanning arrangement as claimed in calim 1, wherein for some time slots the units are not equipped, the multiplex means having connections to produce signals for all N conductors during the time slots for which units are not equipped, wherein the interpreter includes means to produce a signal indicating "all true" in response to all N signals being true, and the new status generator includes means to inhibit the signal "K" in response to the signal "all ture," whereby no messages are produced for unequipped units.

* * * * *